(12) United States Patent
Yang

(10) Patent No.: US 11,610,266 B2
(45) Date of Patent: Mar. 21, 2023

(54) INVESTOR PROFILING AND BEHAVIORAL RISK MANAGEMENT SYSTEM FOR WEALTH MANAGEMENT

(71) Applicant: Jian Helen Yang, Lexington, MA (US)

(72) Inventor: Jian Helen Yang, Lexington, MA (US)

(73) Assignee: Andes Wealth Technologies, Lexington, MA (US)

( * ) Notice: Subject to any disclaimer, the term of this patent is extended or adjusted under 35 U.S.C. 154(b) by 0 days.

(21) Appl. No.: 17/382,141

(22) Filed: Jul. 21, 2021

(65) Prior Publication Data

US 2023/0035818 A1 Feb. 2, 2023

(51) Int. Cl.
*G06Q 40/06* (2012.01)
*G06Q 10/06* (2012.01)
*G06Q 10/10* (2012.01)
*G06F 3/0482* (2013.01)
*G06Q 10/0635* (2023.01)

(52) U.S. Cl.
CPC .......... *G06Q 40/06* (2013.01); *G06F 3/0482* (2013.01); *G06Q 10/0635* (2013.01); *G06Q 10/10* (2013.01)

(58) Field of Classification Search
CPC ..... G06Q 40/06; G06Q 10/0635; G06F 3/482
USPC .................................................. 705/35–45
See application file for complete search history.

(56) References Cited

U.S. PATENT DOCUMENTS

| | | | | |
|---|---|---|---|---|
| 8,086,483 B1 * | 12/2011 | Yuan | ...................... | G06Q 40/06 705/36 R |
| 8,682,777 B1 * | 3/2014 | Epstein | .................. | G06Q 40/04 705/37 |
| 2011/0270780 A1 * | 11/2011 | Davies | ................... | G06Q 40/06 705/36 R |
| 2012/0221485 A1 * | 8/2012 | Leidner | .................. | G06Q 40/08 705/36 R |

* cited by examiner

*Primary Examiner* — Robert R Niquette
(74) *Attorney, Agent, or Firm* — Jie Tan; JT Law Services PC

(57) ABSTRACT

A computerized and quantitative investor profiling and behavioral risk management system that includes risk and behavioral assessment questionnaires and tools, and behavioral analytics including the Behavioral Risk Index, a single number to indicate the investor's tendency for irrational investment behavior during market turmoil. It also includes a tool to help protect senior citizen clients, and an automated Investment Policy Statement generator that is modularly defined and can dynamically generate standard and custom charts.

15 Claims, 33 Drawing Sheets

| IPS | SECTION | | COMPONENT ORDER |
|---|---|---|---|
| | | | 1003 |
| ☐ Standard IPS | COVER_PAGE | —1005 | 1 |
| ☐ Standard IPS | COVER_PAGE | | 2 |
| ☐ Standard IPS | OVERVIEW | —1007 | 1 |
| ☐ Standard IPS | Primary Investment Objectives | —1009 | 1 |
| ☐ Standard IPS | Planning Horizon | —1011 | 1 |
| ☐ Standard IPS | Risk Tolerance Test: {CLIENT_NAME} | —1013 | 1 |
| ☐ Standard IPS | Risk Tolerance Test: {CLIENT_NAME} | | 2 |
| ☐ Standard IPS | Investment Parameters | —1015 | 1 |
| ☐ Standard IPS | Asset Allocation | —1017 | 1 |
| ☐ Standard IPS | Guidelines and Policies | —1019 | 1 |
| ☐ Standard IPS | Important Disclosure Information | —1021 | 1 |

Survey: [Investor Type ▾]
Mapping type: [Direct Mapping ▾]

A/W SURVEY MAPPINGS

| INVESTOR TYPE | Q #1 | Q #2 | Q #3 | Q #4 |
|---|---|---|---|---|
| Investor Temperament [Buy-and-hold ▾] | A | A | D | BC |
| Investor Temperament [Risk avoiding ▾] | B | AB | ABC | |
| Investor Temperament [Trend following ▾] | B | C | ABC | AB |
| Investor Temperament [Contrarian ▾] | C | ABD | E | |
| Investor Temperament [Risk seeking ▾] | C | C | E | |
| Investor Temperament [Adaptive ▾] | AD | AD | ABE | |
| Investor Temperament [Other ▾] | | | | |

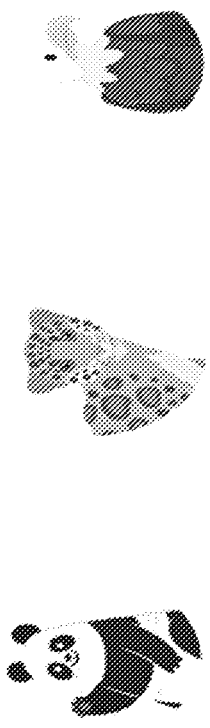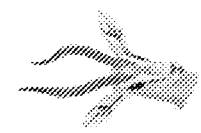
FIG. 19

Loss Aversion

General Information

Survey: [Loss Aversion ▽]

Mapping type: [Direct Mapping ▽]

AW SURVEY MAPPINGS

LOSS AVERSION
Loss Aversion
[Yes ▽]

Loss Aversion
[No ▽]

Loss Aversion
[Some(Secure Gain) ▽]

Loss Aversion
[Some(Double Down) ▽]

| Name | Investor Persona | | | Behavior Risk |
|---|---|---|---|---|
| Search Name | 48 | ∨ | 48 | |
| William Baker | Trend Follower | | | 10 |
| Kingly Johnson | Trend Follower | | | 9 |
| Erica Ciccolo | Safety Seeker | | | 8 |
| Agnes Johnsson | Non-typical Investor | | | 8 |
| Rosa Ricci | Risk Seeker | | | 7 |
| Chad Maks | Trend Follower | | | 7 |
| Jason Kim | Passive Investor | | | 6 |
| David Kelly | Contrarian | | | 6 |
| Deepika Sigh | Passive Investor | | | 5 |
| Alex Walsh | Contrarian | | | 5 |

FIG. 24

INVESTOR PROFILING AND BEHAVIORAL RISK MANAGEMENT SYSTEM FOR WEALTH MANAGEMENT

CROSS-REFERENCE

This Application claims the priority of the U.S. Provisional Patent Application No. 63/057,227, filed on Jul. 27, 2020, and entirety of which is hereby incorporated by reference. This Application is also a continuation-in-part of U.S. patent application Ser. No. 16/418,627 with title "Investor Risk Management System" filed on May 21, 2019, the entire of which is hereby incorporated by reference.

DESCRIPTION OF RELATED ART

The present invention relates to a computerized system for automatic investor profiling and behavioral risk analysis and management for financial advisory services, including but not limited to investment management, financial planning and wealth management, in particular, relates to a computerized system that profiles investment behavior of individual investors based on behavioral patterns and cognitive biases when facing market fluctuations, and determines the overall client satisfaction level combining the client's behavioral risk and the performance of their investment portfolios. Throughout this application, financial planning and wealth management are considered synonyms.

Managing expectations and emotions is half of the battle in an advisory relationship. Classic financial theory assumes that market participants are rational, while behavioral finance claims that investors are subject to emotional and cognitive biases that lead to irrational decision making. Behavioral biases include emotional biases and cognitive biases. For the sake of simplicity, throughout this application, behavioral biases and cognitive biases are considered synonyms.

Throughout this application, investors and individual investors refer to individuals investing in the capital markets such as stocks and bonds, and clients refer to individuals or entities (such as foundations and trusts) who use the services of investment managers and financial advisors. "Investor", "client", and "investor client" are considered synonyms in the context of this patent application. Financial professionals, investment professionals, investment managers and financial advisors are synonyms referring professional providing financial services to clients. "Client profile", "investor profile", "behavior", and "behavioral profile" are synonyms referring to the characteristics and patterns of the investor's thoughts and actions related to investments. "Investor profile attribute", "behavioral factor" are synonyms referring to a specific aspect of the investor profile. Behavioral biases and cognitive biases are synonyms referring to investment behaviors that are not optimal from the economic perspective, hence not strictly rational. Behavioral assessment and risk tolerance assessment are interconnected, and for the sake the conciseness, when behavioral assessment is mentioned, it may include the risk tolerance assessment. Time horizons, time frames and time windows are synonym terms referring to a period with a start date and an end date. At-risk clients refer to clients who are dissatisfied with the services provided by financial professionals, hence at risk of leaving the financial professionals' services. There are further risks that they may take other actions such as lawsuits in attempt to recover investment losses due to real or perceived inadequate services provided by the financial professionals. Real-time risk refers to investment risk analytics and/or behavioral risk analytics calculated by the analytics engine of the invention daily or in real-time as needed.

Note that the points discussed below may reflect the hindsight gained from the disclosed inventions, and are not necessarily admitted being prior art.

The difficulty is well known for financial professionals to use the concepts in behavioral finance to systematically gain insights into client's investment behavior. In order to provide better-informed services, it is important for financial professionals to better understand, manage and mitigate client's behavioral risks in investments, particularly when the markets are dynamic such as during market turmoil. The standard practice in the financial industry is to categorize individual investors into several risk tolerance buckets based on risk tolerance tests and/or questionnaires, then assign a static or semi-static model investment portfolio to match the risk tolerance level of a particular investor. However, the standard risk metrics of the model portfolio is based on a long-term historical average risk metrics calculated over a static period of time such as 30 years, while the market may often have periods of higher risk and negative returns, which can trigger different behavioral responses in investors due to a combination of behavioral biases, the lack of knowledge in investments, and other factors.

Therefore, there is a long-felt need in the financial services field to be able to systematically use behavioral finance to help financial professionals better understand their clients to provide better-informed services, thus having less risk of being accused of inadequate investment recommendations. Currently, financial professionals do not have an adequate method to identify client behavioral risks to help them prioritize and improve client satisfaction.

SUMMARY

The present application discloses a novel software platform to help financial professionals use behavioral finance concepts systematically to provide personalized and better-informed services. In one embodiment, this software platform incorporates a novel method that breaks down behavioral finance into a set of behavioral factors, making it possible to each factor to be assessed to help financial professionals understand clients deeply in order to provide timely and better targeted services. This method provides better client management and mitigates risks of potential allegations of inadequate investment recommendations. The present Investor Profiling and Behavioral Risk Management software platform provides a unique set of methodologies, analytics, and user interfaces to make behavioral finance easy to understand, easy to use, and easy to communicate.

In one aspect of an embodiment, a Behavioral Analytics Engine is implemented to have a set of behavioral assessment tools including unique questionnaires and innovative tools to assess each behavioral factor. Then all behavioral factors are combined to provide a Behavioral Risk Index, a single number ranging from 0 to 10 that indicates an investor's tendency for irrational investment behavior during market turmoil.

In one embodiment, investors are categorized into several investor types, such as buy-and-hold (also known as passive investors), trend follower and contrarian based on a questionnaire. Other questionnaires and tools assess investor's Financial IQ, behavioral biases (such as loss aversion, overconfidence, and herding), preference for ESG (Environmental, Social and Corporate Governance) considerations in investments, and cognitive ability for clients ages 65 and older.

In one aspect of an embodiment, a user account management engine is provided to allow investor clients to take the behavioral assessments from the Behavioral Analytics Engine, and to enter investment portfolios for portfolio analysis. It also allows financial service providers to either conduct those tests with clients during client meetings or send a sequence of questionnaires and tools to clients for them to take at home.

In one embodiment, this software platform implements a tool that facilitates conversations between financial professionals and senior citizen clients who may have potential cognitive declines due to aging, the effects of Alzheimer's, dementia, or other medical conditions. In one aspect of the embodiment, after identifying client's cognitive conditions, financial professionals can timely take protective measures to protect senior clients from potential financial scams, fraudulent acts, and coercions.

In one aspect of an embodiment, the Client Analytics Engine combines the result from the Behavioral Analytics Engine and the Investment Analytics Engine built in the system to provide a client analytics, including a Client At-risk Score.

The present application is built on top of a prior patent application, U.S. patent application Ser. No. 16/418,627 that teaches methods for investment risk management, the entirety of which is therefore incorporated by reference. Combining the assessment of investor's behavioral risk in conjunction with the investment risk, financial professionals can better understand and better serve clients.

BRIEF DESCRIPTION OF THE DRAWINGS

The disclosed application will be described with reference to the accompanying drawings, which show important sample embodiments of the invention, and which are incorporated in the specification hereof by reference, wherein:

FIG. 10A depicts the definition of an Investment Policy Statement in the invention system in accordance with this application.

FIG. 14 shows an example user interface that a client goes through when he/she clicks on the link sent by the financial advisor for building investor profiles in accordance with this application.

FIG. 18 shows an example interface for defining the logic for direct mapping of investor type based on the investor's answers to the Investor Type questionnaire in accordance with this application.

FIG. 19 shows alternative expressions using animal symbols for investor types in the system in accordance with this application.

FIG. 21 shows an example direct mapping of Loss Aversion, a common behavioral bias, based on the answers to the questionnaire in accordance with this application.

FIG. 24 shows an example client management user interface according to behavior risk index rankings in accordance with this application.

DETAILED DESCRIPTION OF SAMPLE EMBODIMENTS

Figure 1:
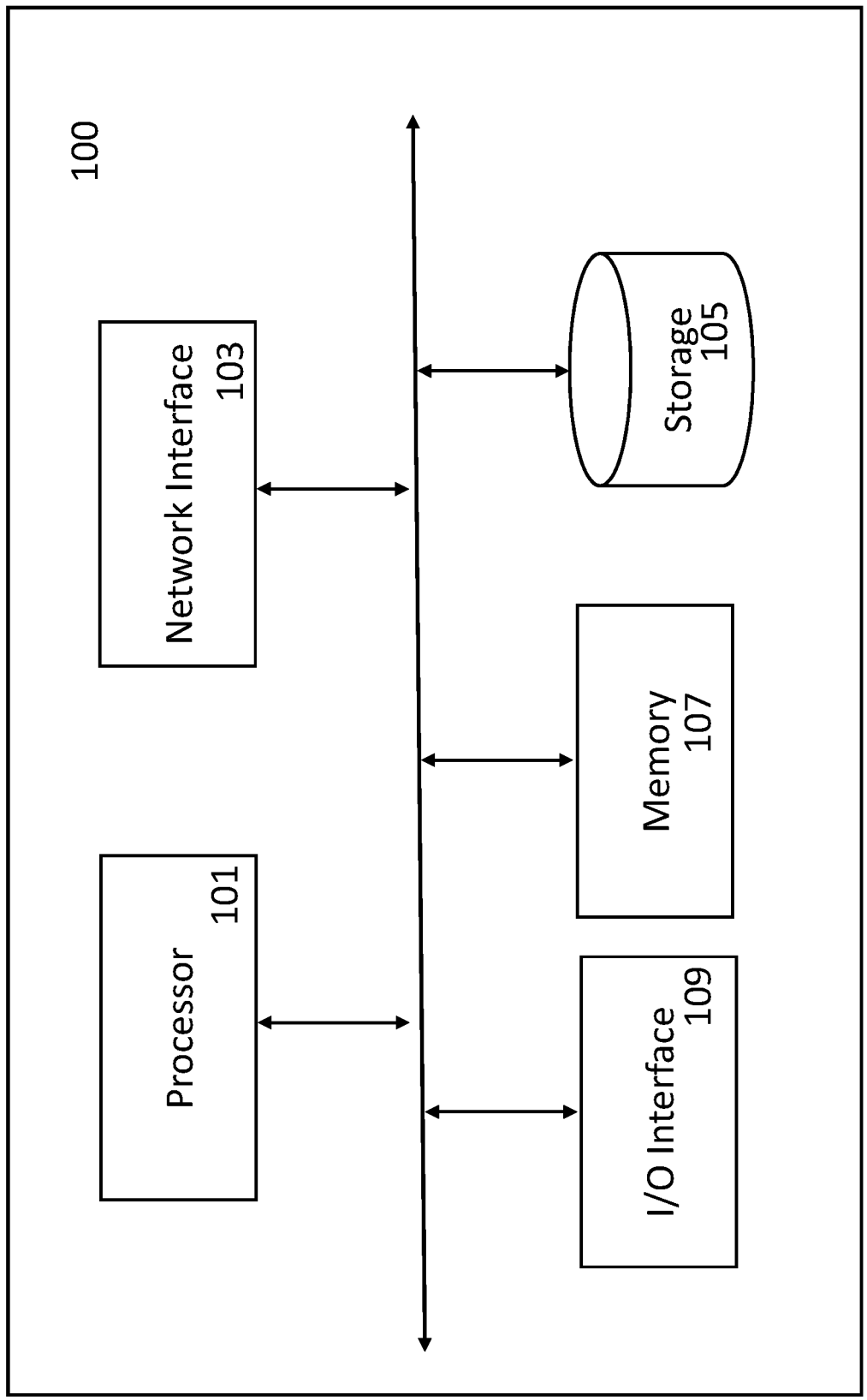
FIG. 1 schematically shows an example required computer structures in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements but may include other elements not expressly listed or inherent to such process, method, article, apparatus, or composition.

All terms and terminologies in this application should be understood in the same meaning as normally used in the field of finance. In finance, the terms "cognitive bias", "behavioral bias" or "irrational behavior" refer to investors' tendency to make investment decisions based on intuitions or gut feelings that may not be optimal from the economical perspective.

Throughout this application, the term "sequence" refers to multiple questionnaires and/or other tools that are chained together in a flow to go through in order.

In finance, the term "security" refers to an instrument that can be invested in, such as a stock, a bond, a mutual fund, or an Exchanged Traded Fund (ETF).

A "portfolio" is a group of financial securities being held by an investor with power to trade, including a combination of individual stocks, bonds, mutual funds, ETFs, and alternative investments to achieve an investment objective. Investment objectives usually mean two things: managing risk exposure and achieving financial return goals.

A "model" is a set of financial securities selected and combined in order to deliver targeted investment objectives including risks and returns that can be used as a template for investment portfolios to follow.

The term "asset allocation" refers to allocating investments among different market segments such as stocks and bonds. Asset allocation is one of the primary considerations in model and portfolio construction. According to financial research, asset allocation is the main driver of investment return as opposed to stock picking or market timing.

The term "return" in this application generally refers to the end value minus an initial value over a specified time window, i.e., the increase in value, divided by the initial value.

The terms "upside" and "downside" refer to a statistical possible financial gain and loss of an investment in capital markets.

The term "process" in this application means computer algorisms that provides a financial solution to be executed by a computer processors and devices for the solution.

The term "method(s)" term means a method for object-oriented programming code whereas it performs a subroutine, normally, it comprises a sequence of programming statements to perform an action, a set of parameters to customize those actions, and possibly an output value or result.

The term "subsystem", "engine" or "module" are used interchangeably, it represents a combination of packages and a set of executable computer codes and classes for performing a particular function on a computer processor. The packages contain all the elements, including unique id elements, models, source files, html files, etc. that have executable codes.

In this application, a "data module" means a set of multiple but unique methods (methodologies) for the automation of remote data network services, data communications, data analysis, data storage, data storage retrieval, data display or interactive user interfaces for data input.

A "Behavioral Analytics Engine" means a set of multiple but unique methods (methodologies) for assessing an investor's behavioral risk stemming from cognitive biases, the lack of knowledge in investments and other factors.

A "Client Analytics Engine" means a set of multiple but unique methods for assessing the client's level of satisfaction or the lack of.

A "graphics engine" means a set of multiple but unique methods (methodologies) for the automation of receiving analytics results and display the results on a screen or a monitor or an I/O interface according to a user's criteria.

A "server" is a functional entity that receives requests from a user or client computer and processes the requests and responds to the user or client computer in accordance with the particular requests.

The term "risk appetite" refers to a broad description of the investor's risk-taking disposition. It is a statement or series of statements that describes their attitude towards risk taking.

Figure 8A:
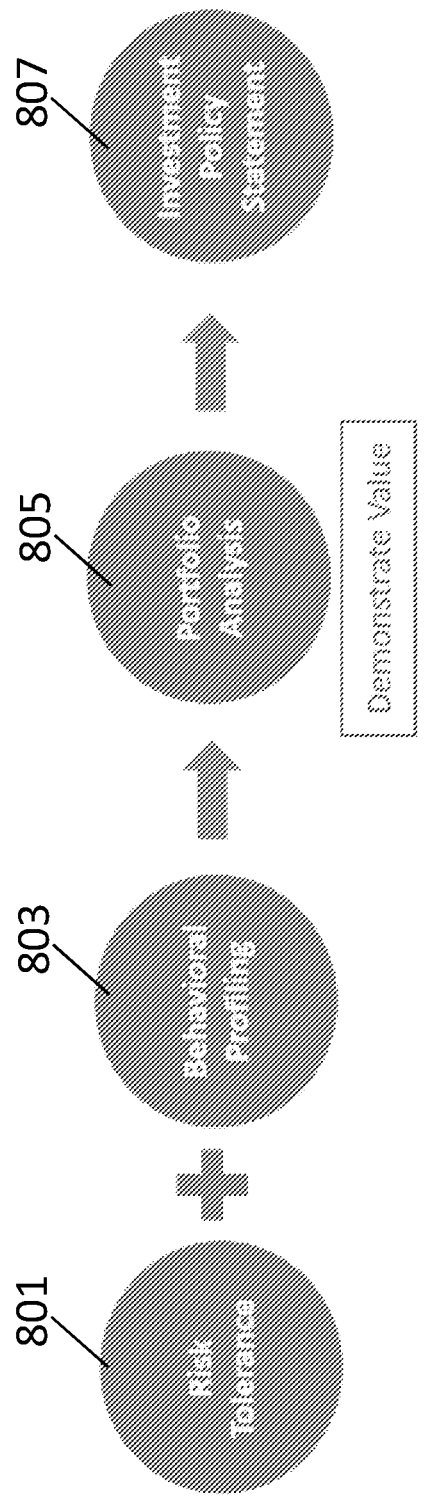
FIG. 8A shows an example set of components of a client onboarding flow for financial planning and wealth management in accordance with this application.
Figure 8B:
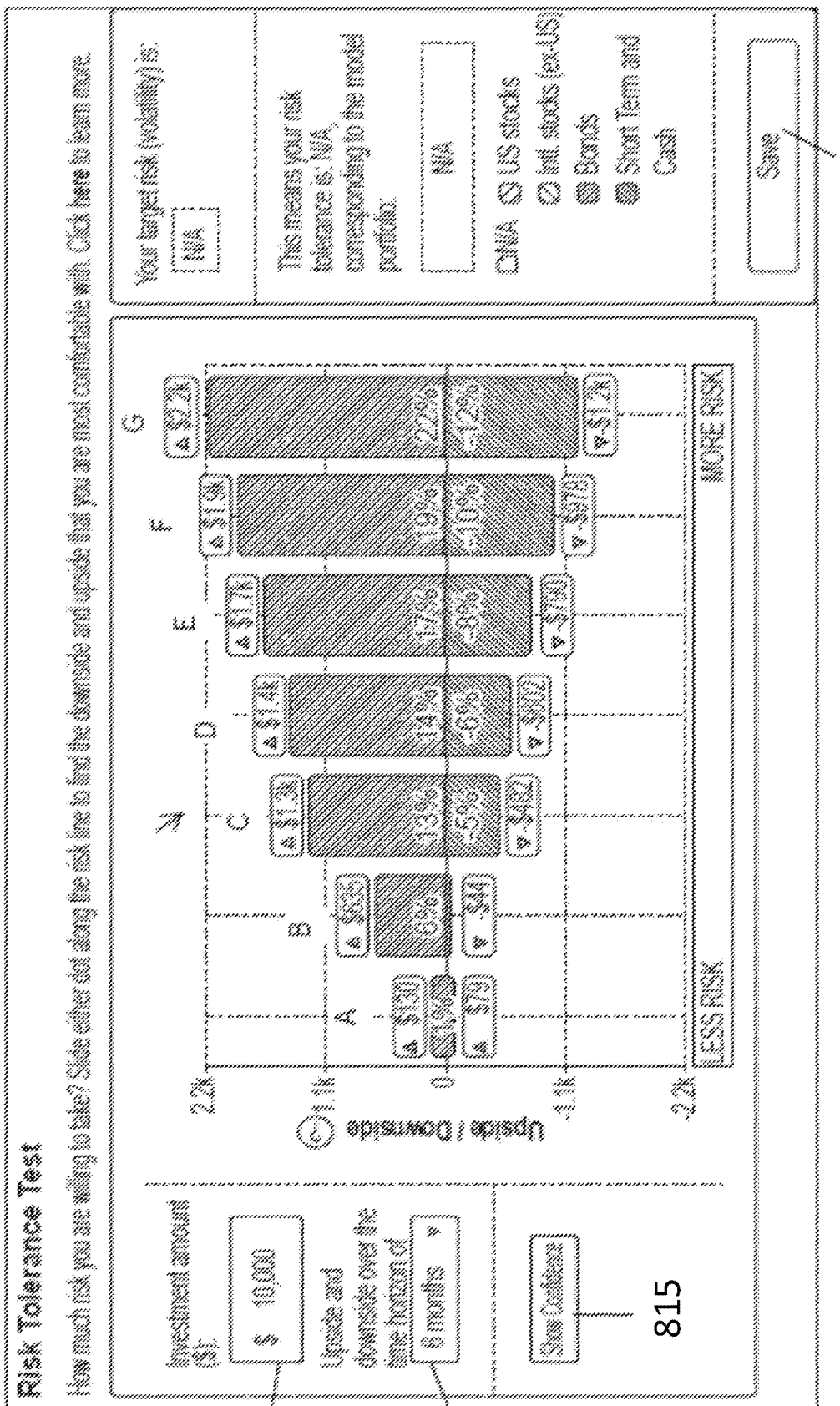
FIG. 8B shows an example user interface for Risk Tolerance Test in accordance with this application.

The term "Risk Tolerance Level" refers to a model asset allocation investment portfolio a user feels most comfortable to choose in a graphic interface as embodied and shown in FIG. 8B where the system will record the user's choice as the Risk Tolerance Level.

The "Behavioral Risk Score" or "Risk Score" of an investor's behavioral factor refers to a number that is assigned to each possible value of a behavioral factor that includes investor type, behavioral biases (including but not limited to loss aversion, overconfidence, and herding), and self-described behavioral factors, financial investment knowledge, risk tolerance inconsistency in order to calculate client's Behavior Risk Index.

The term "Behavior Risk Index" refers to a scoring system used in this application that summarizes the Risk Scores of various behavioral factors, including Investor Type, Behavior Biases (including loss aversion, overconfidence, and herding), Describe Yourself, Financial IQ, and Risk Inconsistency into one single risk index number.

It is contemplated and intended that the computer architecture not only functions in client serving interface, but also encapsulates application services through a service-oriented architecture layer consisting of an application layer, a business service layer, and the orchestration layer.

In managing financial investments for clients, one important task is to manage client expectations and emotional biases. Classic financial theory assumes that market participants are rational and financial markets are efficient, while behavioral finance claims that investors are subject to cognitive biases leading to irrational decision making. Assessing client emotional and personal behavioral biases towards financial markets fluctuations allows a financial advisor to generate tailored financial advising policies and to take cautionary actions in handling client's financial investment. However, to use behavioral finance effectively, financial professionals need a system to help them break down the theories in a sensible and structured manner so they can use it with clients. This application discloses a system that simplifies the complex to enable financial advisors to thoroughly test and quantify client behavioral risks in a user-friendly way.

In reference to FIG. 1, a Client Profiling and Behavioral Risk Management System 100 includes various hardware to transform the digital financial market data and investors' behavioral assessment data into tangible analytics and graphics to be displayed on a monitor screen or to be printed on paper. The computing hardware include processors 101 for loading and executing the computer instructions for analysis, network interface 103 for connecting to remote databases, users, and storage computer chips, database systems 105 for storing data and analytics results, memory 107 for storing live parameters at the computation time in order to execute the analysis software instructions, and I/O interface 109 for displaying and outputting the analytical results from executing the computer instructions for analysis.

Figure 2:
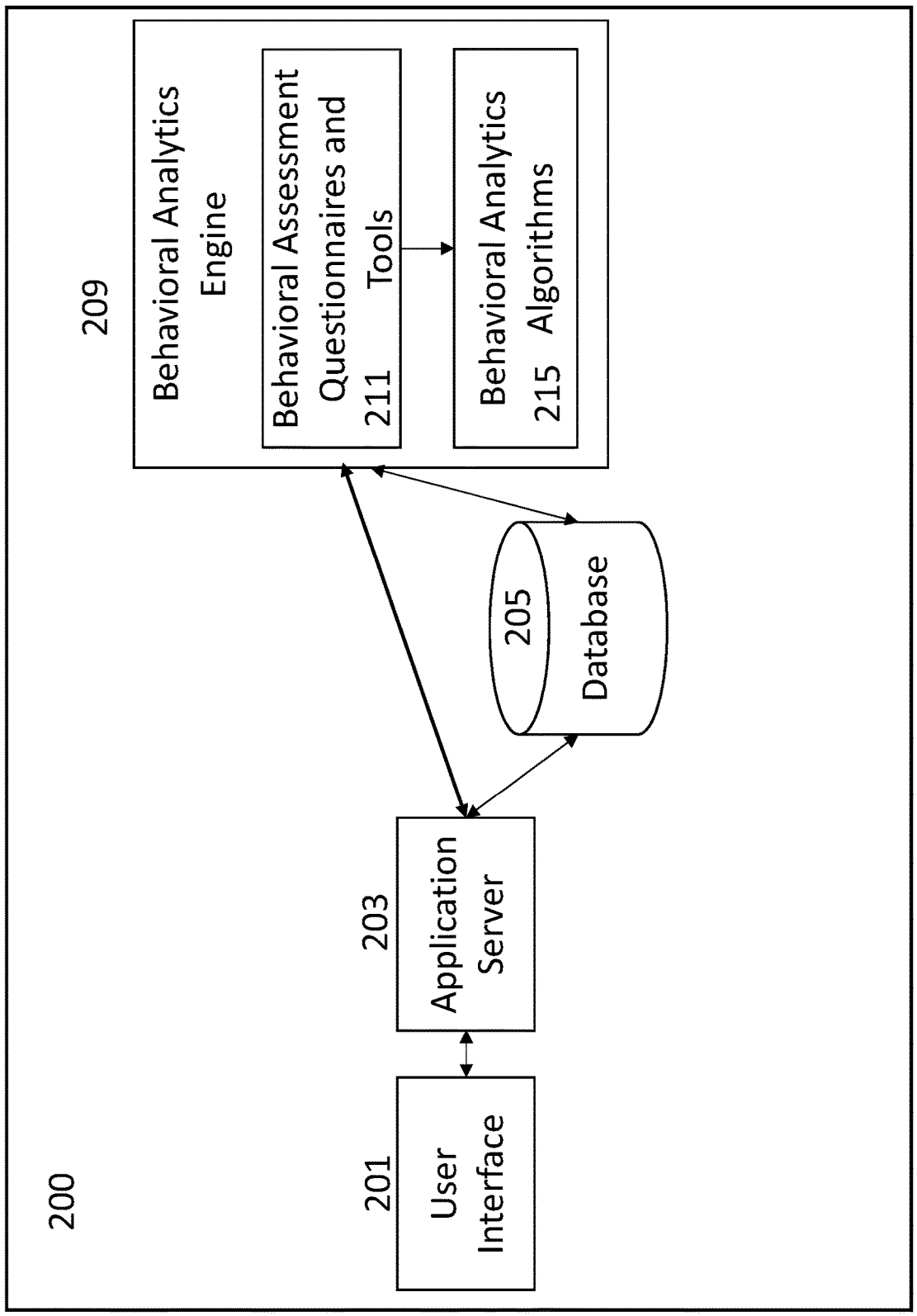
FIG. 2 schematically shows example interactions between the functional components of an example Behavioral Risk Management System in accordance with this application.

In reference to FIG. 2, the functional components of executable instructions for Behavioral Risk Management System 200 are shown. Behavioral Risk Management System 200 includes a user interface module 201 that receives input data and criteria from a user and sends the requests to application server 203 for processing. Application server 203 processes the requests received and retrieves the relevant financial data and user data from database 205 to perform the user requests. Then Behavioral Analytics Engine 209 executes behavioral assessments and calculates the behavioral risk analytics routines and stores the results in database 205. Behavioral Analytics Engine 209 includes a Behavioral Assessment Questionnaires and Tools module 211 that executes behavioral assessment and collects investor's responses, while the Behavioral Analytics Algorithms module 215 processes the data and calculates the behavioral analytics.

Figure 3:
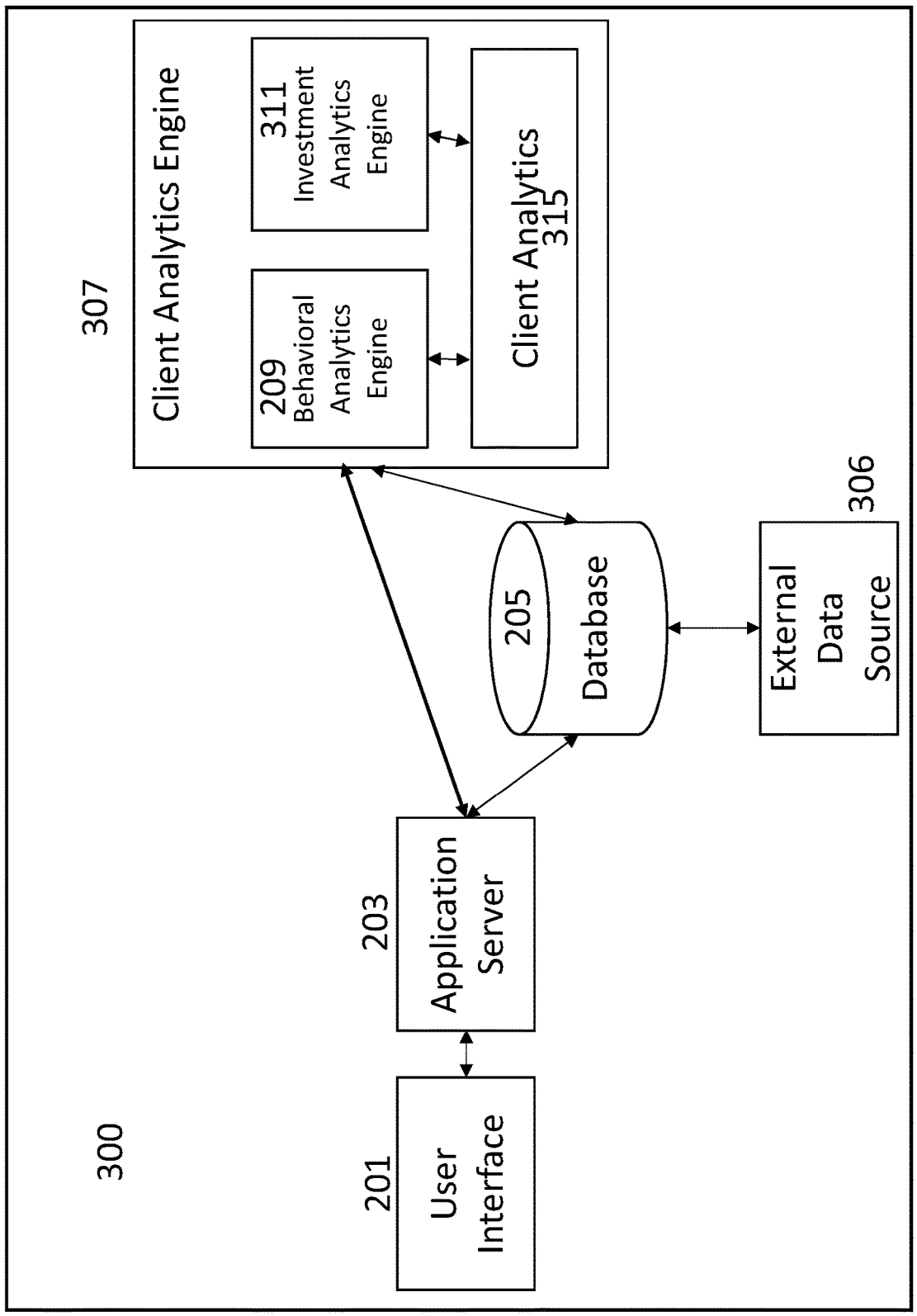
FIG. 3 schematically shows example interactions between the functional components of an example Client Analytics System that consists of the Behavioral Analytics Engine and Investment Analytics Engine in accordance with this application.

FIG. 3 is an extension of FIG. 2 where Client Analytics Engine (307) takes the output from the Behavioral Analytics Engine 209 and the Investment Analytics Engine 311 to calculate client analytics (315) to produce a Behavioral Risk Index of an investor. External Data Source (306) provides investment data needed by the Investment Analytics Engine 311.

Figure 4:
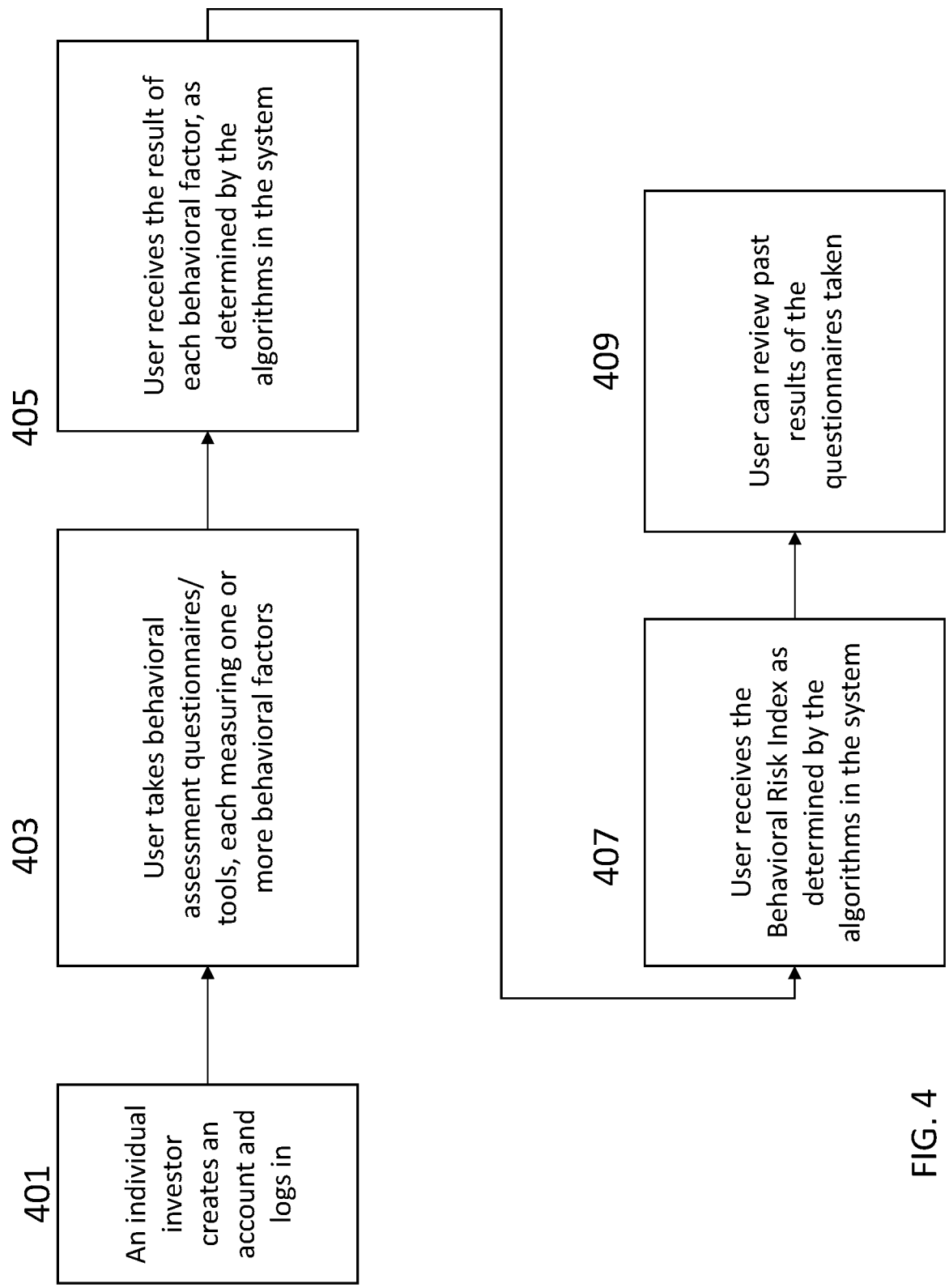
FIG. 4 is a flow chart for an investor user to conduct behavioral assessments to assess his/her behavioral risk in an example Behavioral Risk Management System in accordance with this application.

In reference to FIG. 4, it shows a flow chart of functions and user interfaces of system 200 in FIG. 2 for individual investor clients. At user interface 401, an individual investor creates an account in the system, and he/she can then log into the system. At user interface 403, the user takes one or more behavioral assessment questionnaires and tools for risk assessment. At user interface 405, the user receives the result of the behavioral assessments. At user interface 407, the user receives the Behavioral Risk Index, a single number ranging from 1 to 10 that indicates the investor's tendency for irrational behavior, which is recorded in the user's profile and displayed in the user interface. At user interface 409, the investor can review past results at any time.

Figure 5:
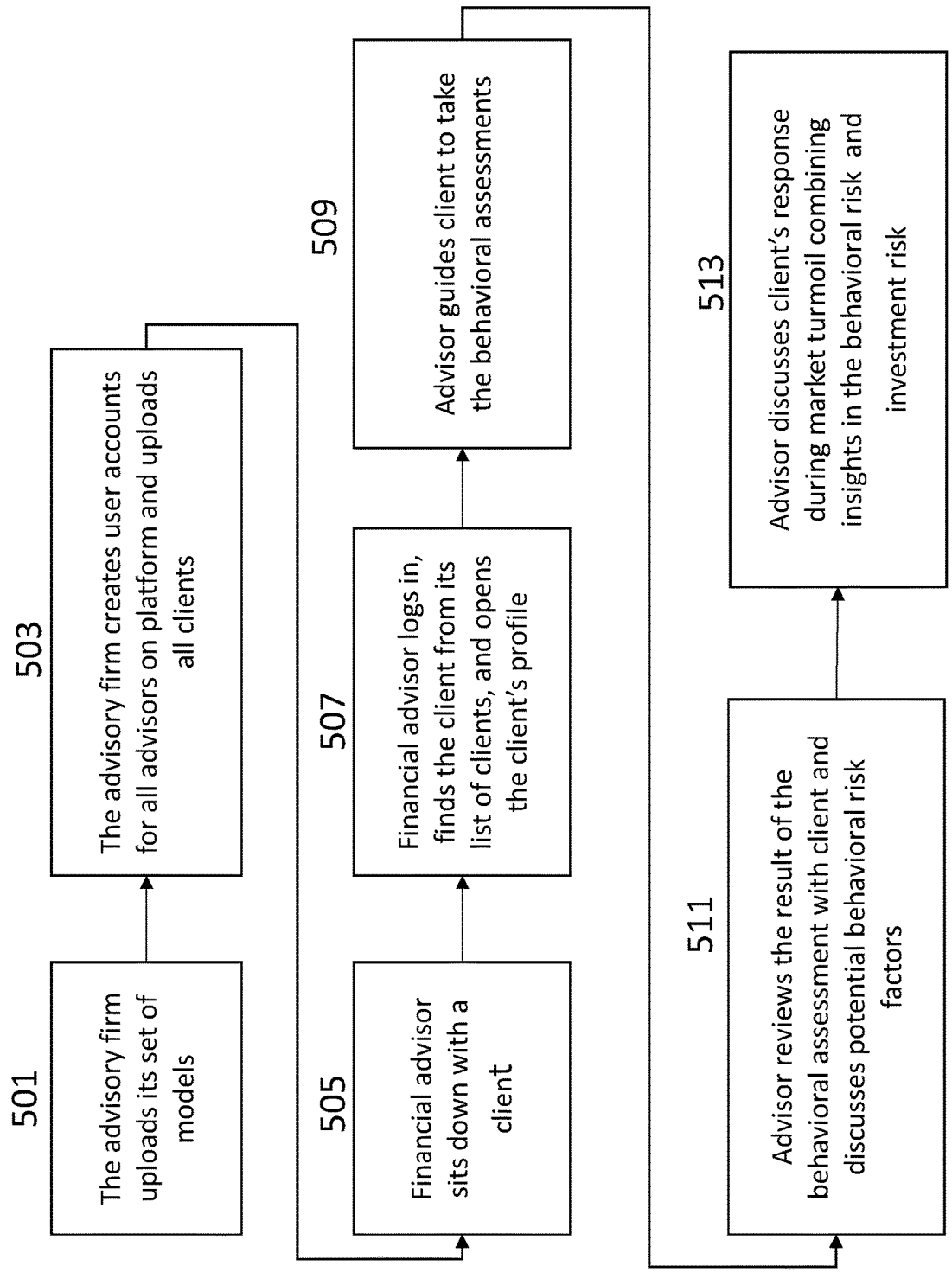
FIG. 5 is a flow chart for financial professionals to work with their clients to conduct behavioral assessment in an example Behavioral Risk Managing System in accordance with this application.
Figure 6:
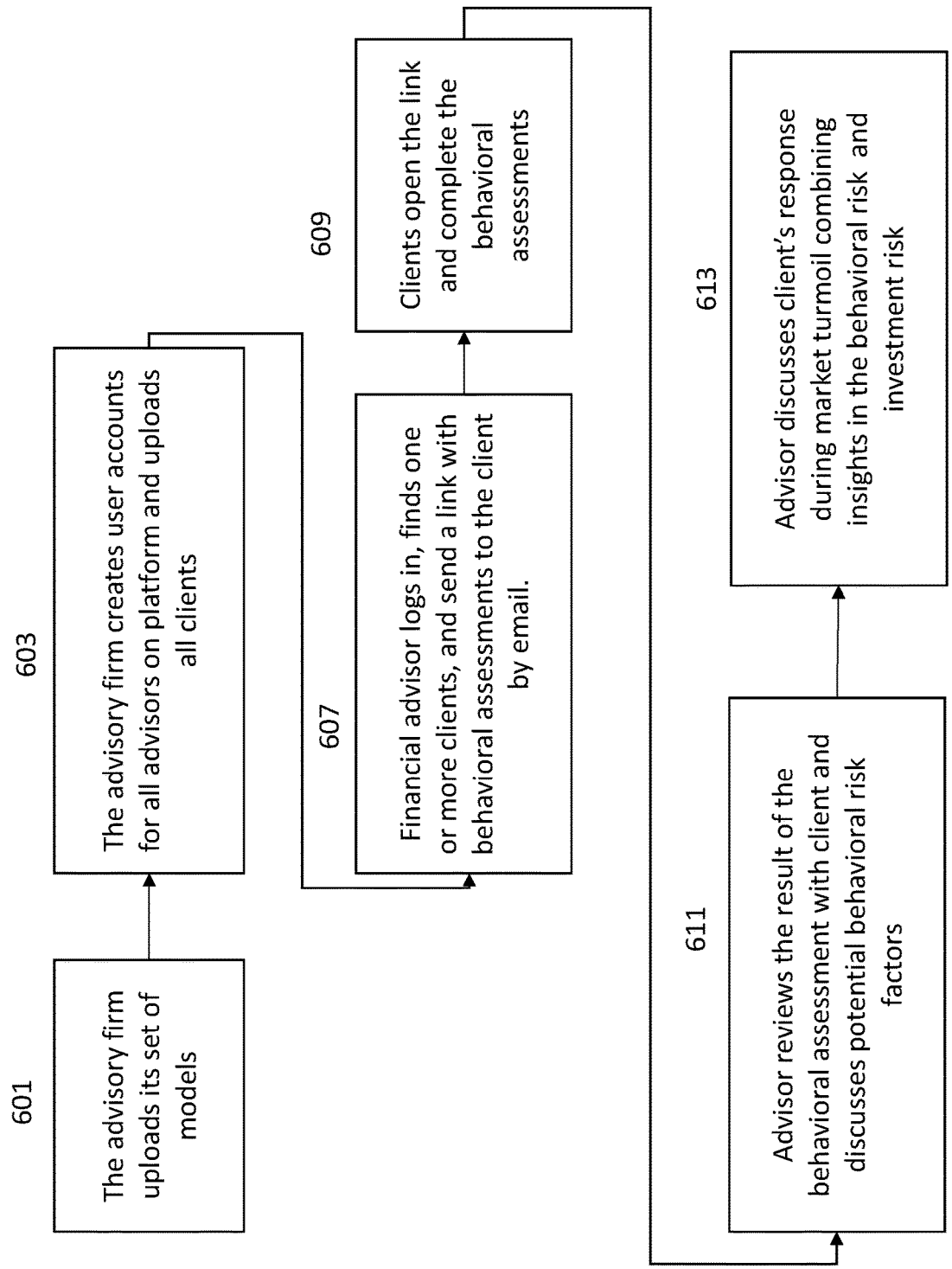
FIG. 6 is an alternative method for financial professionals to assess potential client behavioral risks by sending emails containing links containing a sequence of risk and behavioral assessment questionnaires and tools to clients in accordance with this application.
Figure 7:
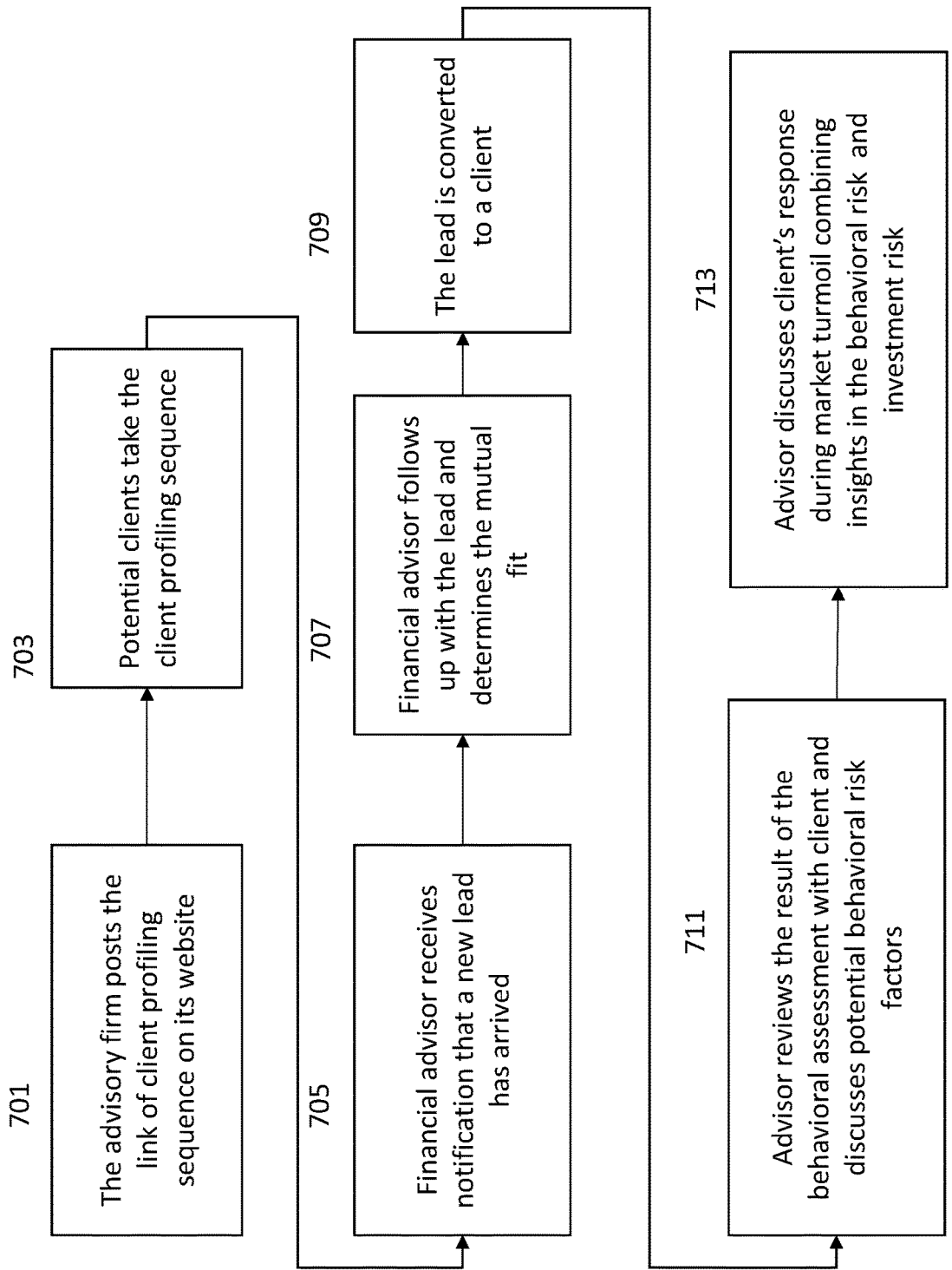
FIG. 7 is another alternative method for assessing potential client behavioral risks by providing a link on the financial professional's website that takes the potential clients to a sequence of risk and behavioral assessment questionnaires and tools hosted by an example Investor Profiling and Behavioral Risk Management System in accordance with this application. A potential client is also known as a lead or prospect, and this is the lead generation flow.

FIG. 5, FIG. 6, and FIG. 7 demonstrate three alternative ways that financial advisors can elect to use the system to conduct behavioral assessments of clients at their own convenience or at the convenience of the clients.

In reference to FIG. 5, it is a flow chart of functions and user interfaces of system 200 in FIG. 2 that a financial advisors can elect to use during a client meeting. At interface 501, an administrator of the financial advisory firm uploads a set of financial models that can be used by all financial advisors at the firm, at 503 interface, the administrator of the system creates user accounts for all financial advisors so they can login to use the system. At user interface 505, when financial advisor meets with a client, the financial advisor logs into the system, and finds the client and opens the client's profile at user interface 507. At step 509, the financial advisor can guide the client to go through the behavioral assessment steps, and at steps 511 and 513, the financial advisor can review the behavioral risk analytics result and discuss with client.

Figure 12:
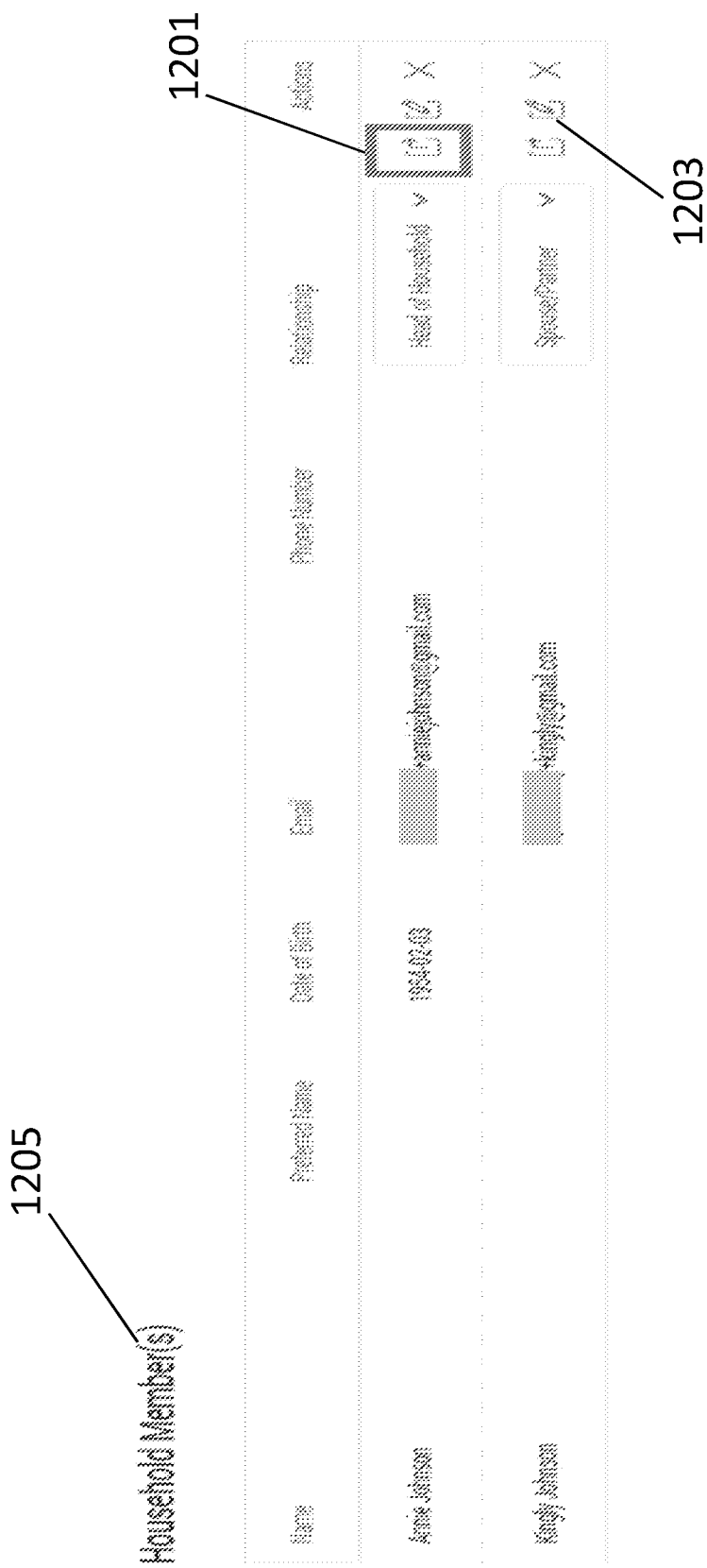
FIG. 12 shows an example user interface for financial advisors to initiate client behavioral risk assessment process by sending a link to a household member to build client profiles in accordance with this application.
Figure 13:
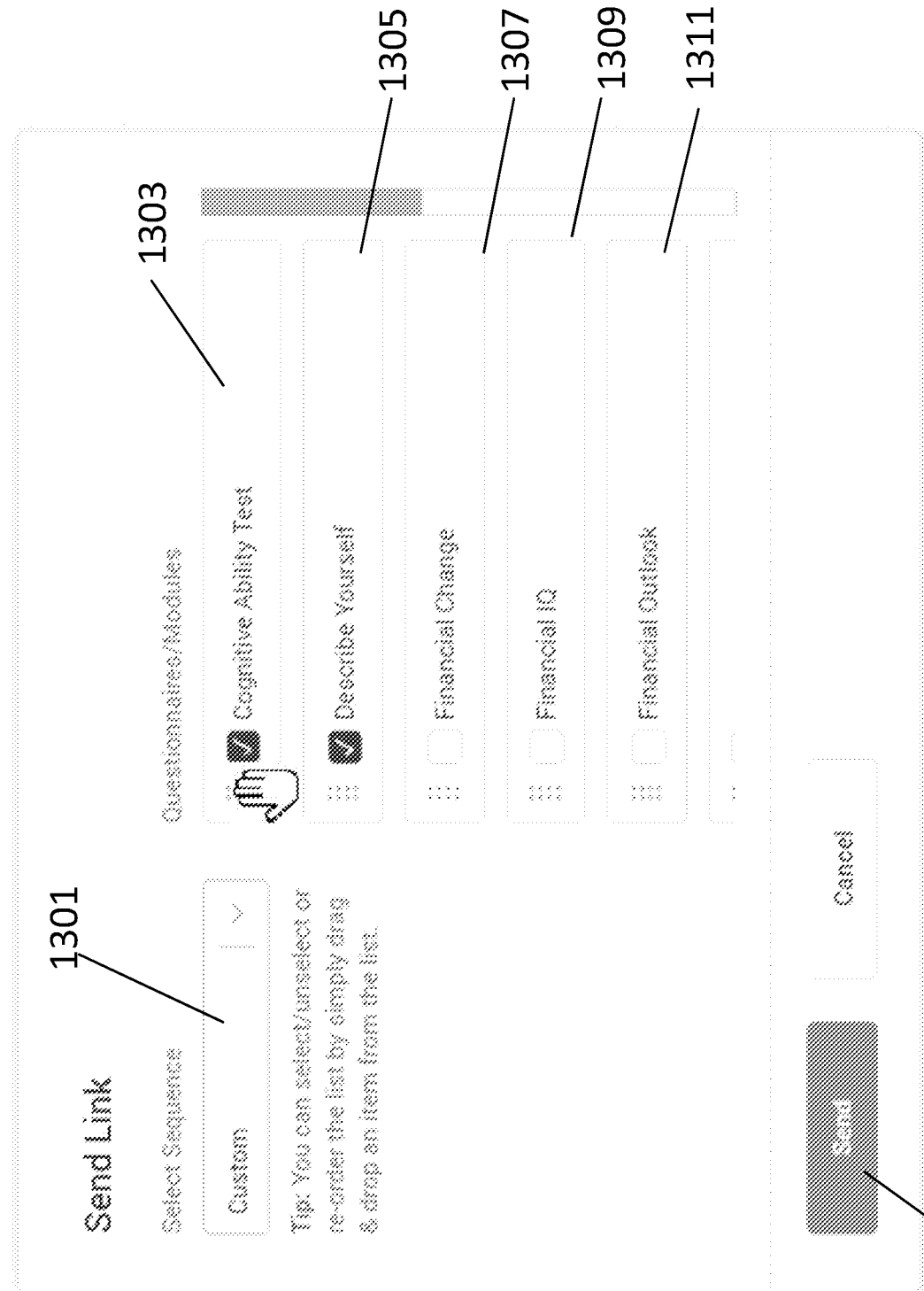
FIG. 13 shows an example user interface as the next step for a financial advisor to send a link with a set of desired sequence of questionnaires in accordance with this application.

The system provides other alternative ways for a financial advisor to communicate with a client about the behavior risk assessments. FIG. 6 illustrates a workflow where financial advisors can send a link containing a pre-arranged sequence of behavioral assessment questionnaires and tools to a client via email so the client can go through the process at their convenient time and place. Financial advisors may send the link to the client ahead of time, and then discuss the results during the client meeting. Many financial advisors prefer this approach because it saves time, and clients can take the tests at home without any pressure. FIG. 12 and FIG. 13, show an example embodiment of such approach where financial advisors can send link directly from a household member profile. The link may contain any number of tests arranged by the financial adviser.

FIG. 7 illustrates another way for a financial advisor to receive a potential client's behavior assessment. At step 701, the financial advisory firm posts a link on its website that leads potential clients to a sequence of behavioral assessment questionnaires hosted by the invention system. After a potential client takes the assessment on the web, a financial advisor receives the results at step 705. At step 707, a financial advisor may follow up with the potential client and review the behavior risk assessment with the potential client to give well-prepared and targeted financial suggestions at step 711 and 713. In this use case, visitors of the firm's website click on a link that is specific for this firm and go through the risk and behavioral profiling questions, and the system captures the visitors' particular behavioral information so financial advisors can follow up and to potentially convert them to clients.

FIG. 8A illustrates an example workflow for a new client onboarding process, which includes four steps: a Three-dimensional Risk Tolerance Assessment 801, Behavioral Profiling 803, portfolio analysis 805 for financial advisors to demonstrate value, and the generation of the Investment Policy Statement (IPS) 807. The present system integrates both client's risk tolerance assessment and behavior profiling to help financial advisors understand clients' need and risks from many different angles.

The Three-dimensional Risk Tolerance Assessment provides three different ways to measure an investor's risk tolerance to ensure accuracy: the Risk Tolerance Test (RTT), Risk Appetite questionnaire, and "Describe Yourself", a self-assessment tool that asks investors to self-identify their behavioral factors including the risk-taking disposition.

The Risk Tolerance Test, a key component in the three-dimensional Risk Tolerance Assessment, and the portfolio analysis are part of the visual investment management method that has been disclosed in U.S. patent application Ser. No. 16/418,627 filed on May 21, 2019, the entirety of which is thus incorporated by reference. But briefly, in reference to FIG. 8B, Risk Tolerance Test screen 810 is shown to allow a user to select his/her risk tolerance level based on the upside and downside of an investment outcome displayed in the graph. In the example, the system first displays a pre-loaded default set of seven investment models A-G ranging from lower risk to higher risk in the chart. Alternatively, the advisory firm can load its own set of models, and the firm's own set of models will be displayed. On the left side of the screen, the user can select a time frame at 811 for the calculations of the upsides and downsides and enter an investment amount at 813.

In order to graphically demonstrate to the user what their actual choices look like, confidence box 815 is given that defines the confidence interval to determine the range of upside and downside based on a normal statistical distribution (the bell shape), with the default set to 80% confidence interval, while giving the option to set to 95% confidence interval and expected value for the upside and downside.

Upon viewing these gain and loss bars as shown in FIG. 8B, the user can decide which investment model he/she is most comfortable with to use as guide to build his/her investment portfolio. The user can directly click on one of the bars to choose a model portfolio, the system will record the user's choice as the Risk Tolerance Level when the user clicks the Save button 817.

The system provides three ways to measure investor's risk tolerance, if the three ways give consistent results, it confirms the accuracy of the measurement, and inconsistent results would raise a red flag that warrants a deeper conversation with the client. It also allows the realization that possibly the chosen portfolio may not be the best fit for the client. Therefore, investor's risk inconsistency is considered a contributing factor to the investor's Behavioral Risk Index. To quantify the inconsistency, the result of the Risk Tolerance Test is numerically scored to facilitate comparison. The scoring assignment for the Risk Tolerance Test is shown in Table I.

TABLE I

Scoring of the Investor's Risk Tolerance Test Result

| Risk Tolerance Test Result | Score |
| --- | --- |
| Conservative | 1 |
| Moderately Conservative | 2 |
| Moderate | 3 |
| Growth | 4 |
| Aggressive | 5 |
| Aggressive Plus | 6 |

Figure 9:
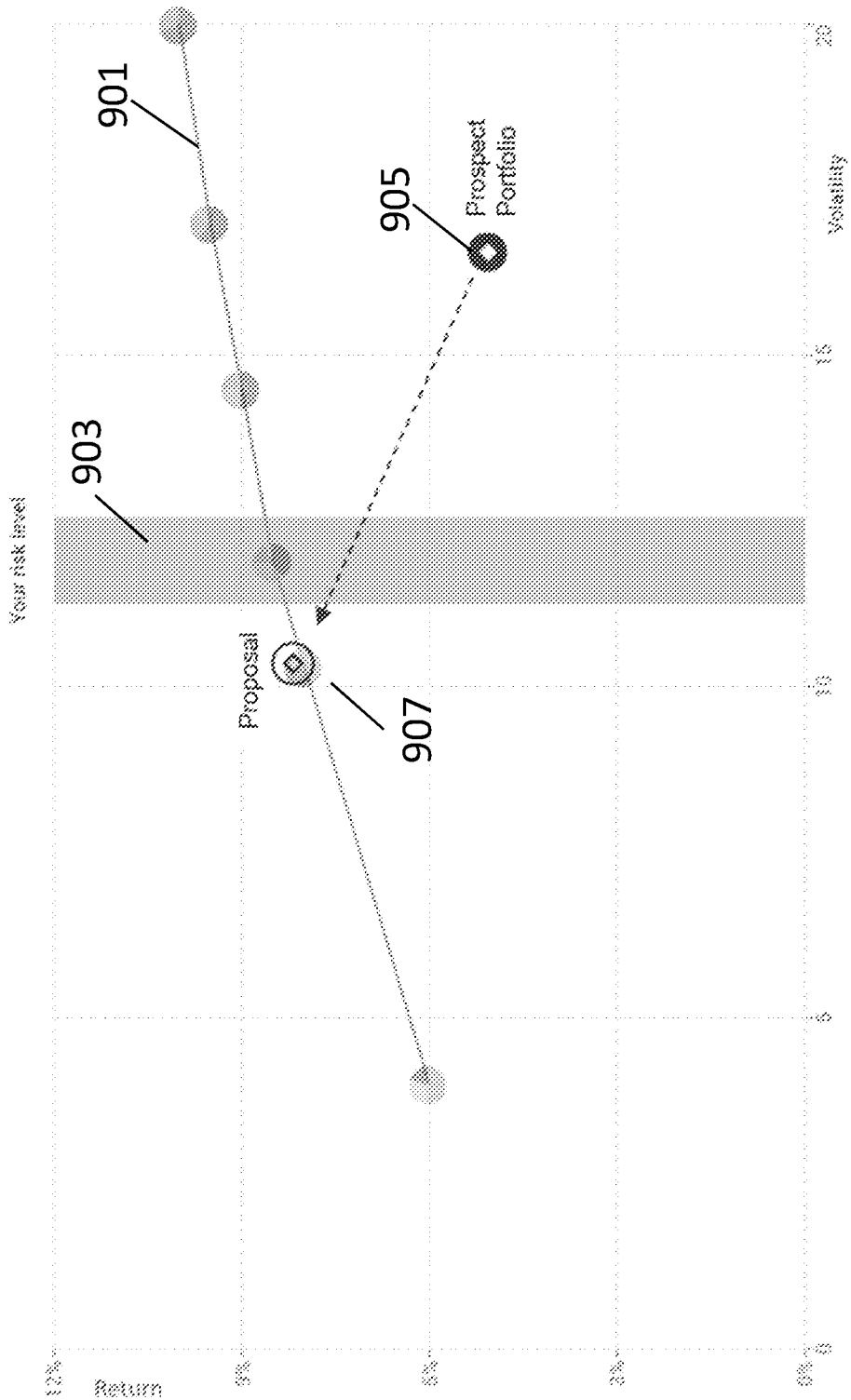
FIG. 9 graphically demonstrates whether the risk of an investor's portfolio aligns with their risk tolerance level in accordance with this application, and whether the portfolio is efficient in relative to the efficient frontier.

The system further provides a visual demonstration to help financial advisors illustrate to potential clients as to how to improve their investment. As shown in FIG. 9, when people manage investments on their own, their portfolios are often not aligned with their risk tolerance, nor on the efficient frontier 901. The efficient frontier visualization makes it easy to illustrate both problems. The vertical blue bar 903 indicates the client's chosen risk tolerance level (from the Risk Tolerance Test), and the solid red circle 905 indicates the prospect's existing portfolio. This example shows that the portfolio's risk is not aligned with client's risk tolerance level, but it is also below the efficient frontier. The empty red circle 907 indicates the proposal portfolio, visually demonstrating how both problems can be fixed by proposing to move investor's portfolio 905 to 907 which is both in line with efficient frontier 901 and within risk tolerance level 903. This visual investment management method has been disclosed in U.S. patent application Ser. No. 16/418,627.

When the client is ready to commit, the system then generates an Investment Policy Statement (IPS) 807 by pulling together multiple components of the invention system using an automated process called the IPS Generator. IPS is an important step to document the agreement between financial advisor and client. Financial professionals are often confused about what information should be placed into the IPS, and currently commonly available IPS documents vary widely, ranging from 2 pages to 33 pages. However, the present client management system provides the easiness of generating IPS with the click of a button, where all relevant information is assembled into a state-of-the-art IPS, including the result from the Risk Tolerance Test. The IPS document may be white labeled with the financial services firm's logo, and fully customizable for maximum flexibility.

FIG. 10A demonstrates an IPS templating process in the system. The IPS is comprised of sections 1001, including sections 1005-1021 shown as examples. Each section includes one or more components, with each component being a title, heading, paragraph of text, list, image, or dynamically generated chart. Component order 1003 specifies the order of the components in its section. The standard IPS template has 19 sections comprising a total of 65 components.

Two IPS templates are defined in the system that are available to all financial advisors. A custom IPS template can be constructed for a financial advisory firm, which is only visible for the firm.

In reference to FIG. 10A, the Cover Page section 1005 contains the financial advisory firm's logo, name, client's name(s), and the financial advisor's name. The Overview section 1007 contains multiple paragraphs explaining the purpose of the IPS. Primary Investment Objective section 1009 is populated with the client's investment objectives such as education and retirement goals that the client or advisor has entered before and retrieved by the IPS generator from the database 205.

Figure 10B:
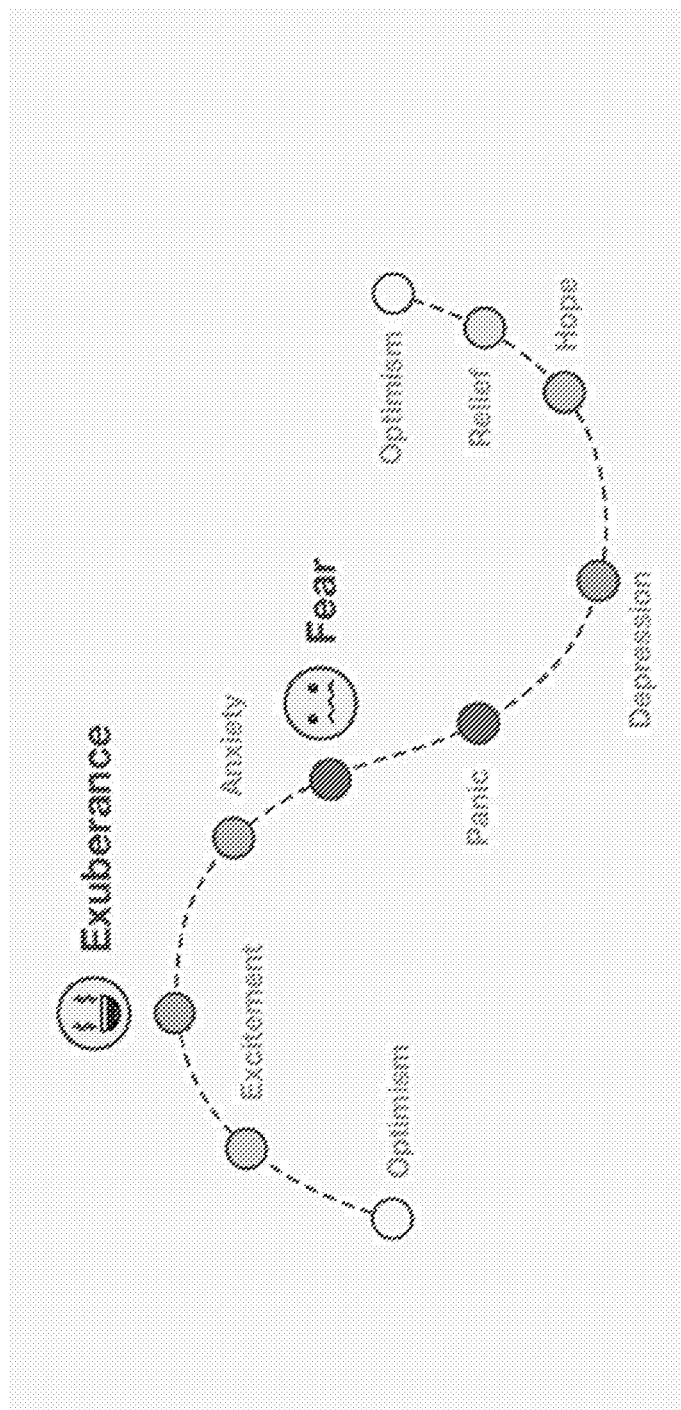
FIG. 10B graphically demonstrates the oscillation of human emotions during a market cycle.

The Planning Horizon section 1011 emphasizes the importance of staying on course through all market conditions and uses the visual presentation to educate clients on how investor emotions oscillate through the market cycle as shown in FIG. 10B. Clients usually have no problem agreeing to it when the market is calm, but when market is in turmoil, the IPS serves as the reminder to keep their emotions in perspective.

The Risk Tolerance Risk section 1013 retrieves the result from client's Risk Tolerance Test and dynamically generates the graphics illustrated in FIG. 8B populated with the client's result. If the client household has two adult investors, the results from both investors are shown.

Figure 11A:
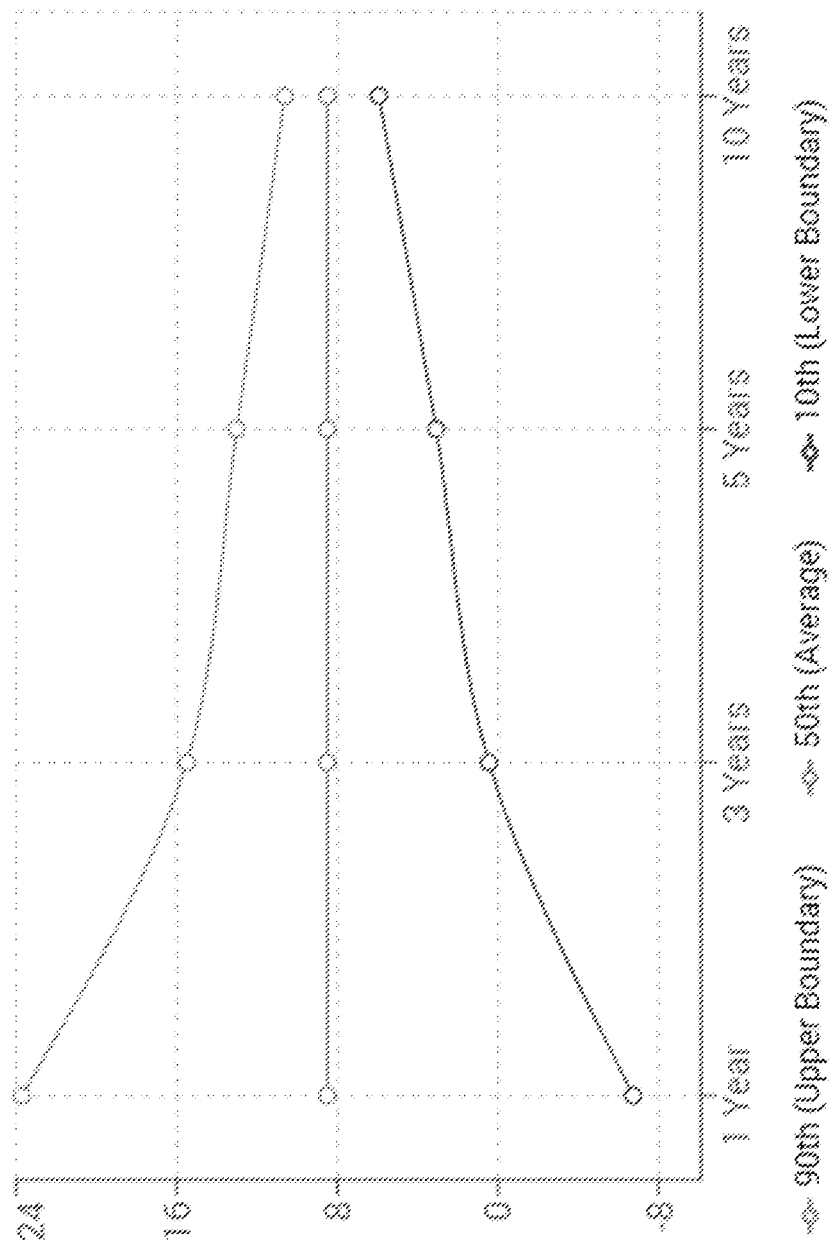
FIG. 11A graphically demonstrates the range of possible outcomes for an investment portfolio getting narrower when looking at longer investment time horizons, indicating more certainty with the outcomes.

The IPS is the right instrument to tell the long-term investment story to the investor client. In the present system, the IPS continues the long-term story with the Investment Parameters section 1015, including a dynamically generated chart as illustrated in FIG. 11A, which shows how the range of possible outcomes becomes narrower as the investment horizon increases from 1-year to 3-year, 5-year, and 10-year, for the model chosen by the head of the household in the Risk Tolerance Test.

Figure 11B:
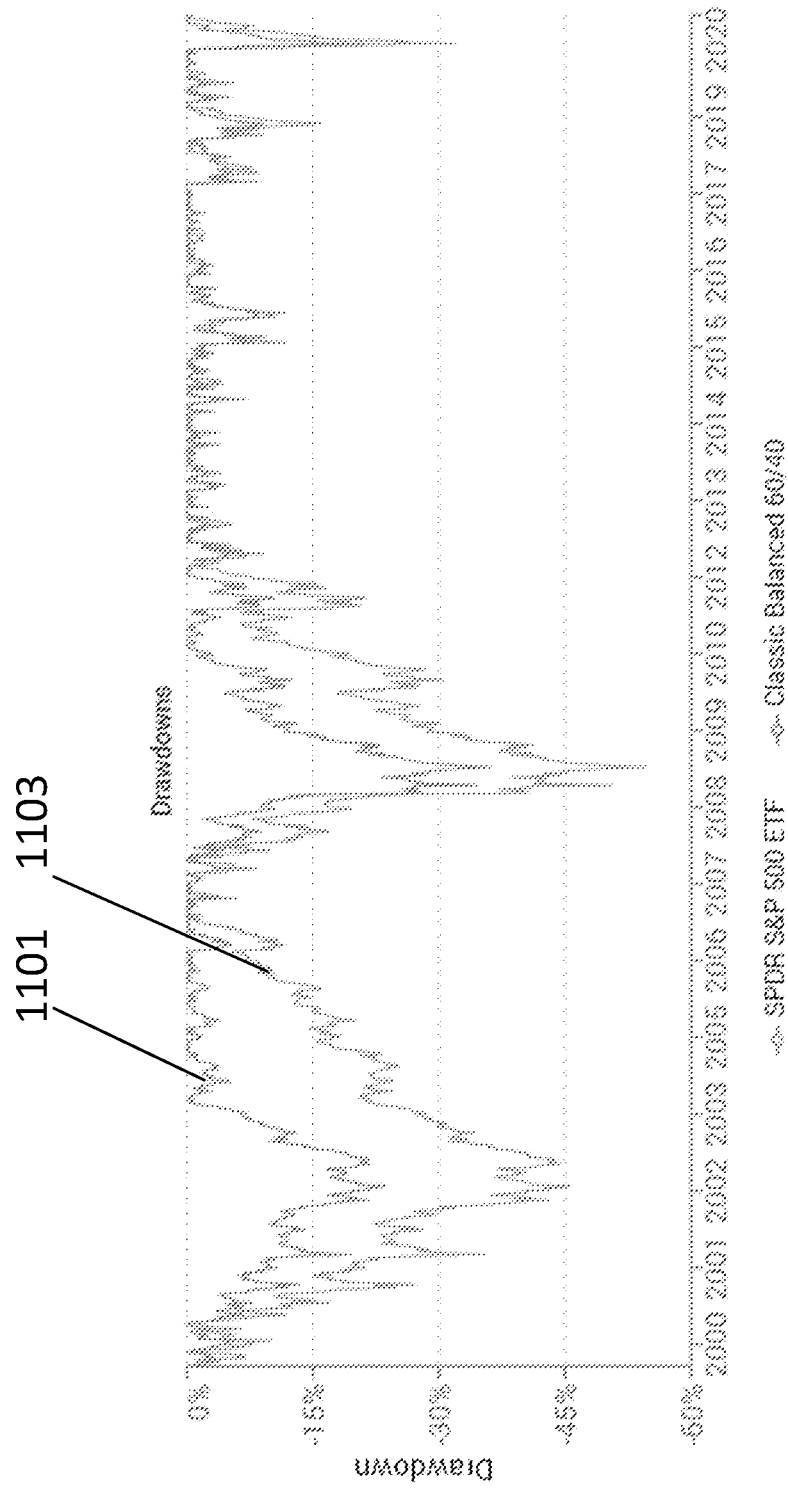
FIG. 11B graphically demonstrates the drawdown comparisons of a balanced portfolio and the market portfolio as represented by the S&P 500 index.

The client education continues with the concept of diversification. The Asset Allocation section 1017 shows the asset allocation of the model assigned to the client, and annual returns of the model comparing to the benchmark as well as the dynamically generated drawdown charts as illustrated in FIG. 11B. The drawdown is defined as the loss of market value from the highest point. The example in FIG. 11B shows the drawdown of the balanced portfolio 1101 versus the benchmark 1103 (in this case, the benchmark is the market as represented by the S&P 500). While a balanced portfolio 1101 may not have all the upside of the market 1103, it does not have all the downside either. It shows the importance of diversification.

The Guidelines and Policies section 1019 includes multiple paragraphs of texts that describes how often the IPS needs to be updated, considerations behind the portfolio recommendations and how often the portfolios will be rebalanced, and duties and responsibilities of the clients and the financial advisors.

The Disclosure section 1021 is populated with the disclosure for the firm. The invention system provides a default disclosure, which the financial advisory firm can use or customize with its own language. The IPS ends with the signature section pre-populated with the adult investors of the client's household.

Please note that adopting a long-term investment goal does not mean the investment strategies should stay the same during the market turmoil. There are two types of investment strategies: strategic asset allocation and tactical asset allocation. An asset allocation refers to how the assets are divided among each asset classes including: stocks, bonds, and cash. Within each asset class, there are subcategories, for example, for stocks, there are US stocks and international stocks. Strategic asset allocations keep the asset allocation intact during market changes, while tactical asset allocation adjusts asset allocation based on changes in market conditions, either using an algorithm or human judgement. Both types of investment strategies need time to work. The reason is obvious for strategic asset allocations. For tactical asset allocations, not every change in asset allocation turns out to be the right move, so investors also need to give the investment professionals the time to see if it works well over time.

Therefore, managing client expectations and emotions during market turmoil is an important part of financial advisors' job. If handled correctly, it strengthens the client's trust and confidence in the financial advisors. If handled incorrectly, financial advisors may appear insensitive to client's feeling and incompetent in managing investments. This client management system offers financial advisors a way to quantitate clients' behavioral risks and help clients better understand their own emotions.

For example, loss aversion and overconfidence are two common behavioral biases. Loss aversion reflects the aspect of human emotions where the pain of losing is twice as strong as the pleasure of gaining. With the knowledge of human emotion on amplification of loss, financial advisors can confidently ask clients to cut their panic by half. Overconfidence is the tendency for people to overestimate their abilities. One of the best-known examples is Ola Svenson's study in 1981, where 93% of Americans rate themselves as better than average in driving. People with overconfidence believes that it is doable to time the market and/or pick the right stocks to beat the market, hence expecting the investment professionals to be able to do it, a tall order that most professionals cannot deliver. Financial advisors can tell clients that it is not a rational expectation, and they are not in the business of timing the market.

However, financial advisors cannot talk about behavior and emotions in a vacuum. To build credibility, they need to deliver real insights in investments. This client management platform can provide deep analytics and visualization to help monitor market turmoil and engage clients in more meaningful conversations.

Deep analytics and its visualization have been disclosed in U.S. patent application Ser. No. 16/418,627. However, the pandemic offers an example that is too good to pass. During the pandemic, the market dropped precipitously, hitting its lowest point on Mar. 23, 2020. Looking at the investment analytics, for the 1-month ending Mar. 23, 2020, the system would show the portfolio risk is temporarily higher than the client's risk tolerance, but the system also provides longer time frames, such as 3-year time frame, where the risk is still aligned, and the return, while not impressive, is within the parameters of the Risk Tolerance Test. In the month that followed, i.e., for the month ending Apr. 23, 2020, and later, visualizing deep analytics indicates that while the risk was higher than normal, the return was strong. This example clearly shows the client why timing the market is often a futile effort—who would have expected the market to bounce back so quickly and so strongly while COVID situation was still out of control?

To better understand the client's behavioral profile, a set of questionnaires and tools are used to assess each aspect of investor behavior. Financial advisors can send a link to the clients for clients to take a sequence of questionnaires and tools at home. Because each family member may have different risk tolerance and behavioral profile, it is important to capture it for at least the core family members. In reference to FIG. 12, the household has two members as shown by 1205. The financial advisor can start building client behavioral profiles by clicking "sending link" button 1201. The manual editing button 1203 allows the financial advisor to enter or edit the email address for the client.

Upon clicking on "sending link" button, the financial advisor is presented with a pop-up window, as shown in FIG. 13, where the advisor can use a pre-defined sequence or custom sequence (1301) by selecting the desired questionnaires and tools and organizing the orders of the components. FIG. 13 illustrates an example where the sequence contains the Cognitive Ability Test (1303), followed by Describe Yourself (1305), while not including Financial Change (1507), Financial IQ (1509) and Financial Outlook (1311). When the advisor clicks on the Send button (1315), an email is sent to the client with a link containing the two choices, and the client can click on the link to go through the sequence defined by the advisor.

Figure 14:
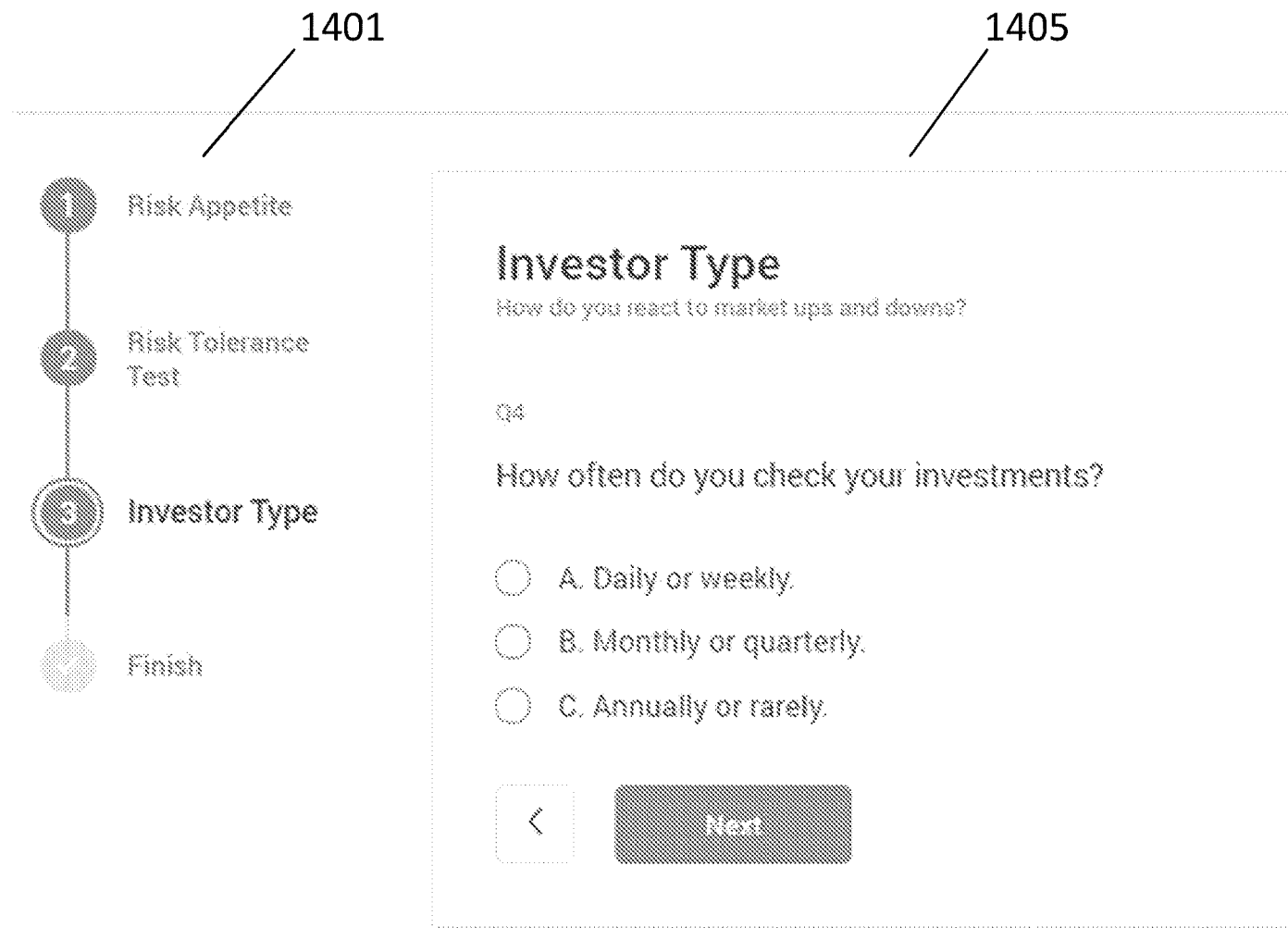

New clients are recommended to start with the predefined sequence "Risk Tolerance Plus", which includes three components: the Risk Appetite questionnaire, Risk Tolerance Test, and the Investor Type questionnaire. FIG. 14 illustrates the user interface when the client opens the link for this sequence. The progress panel (1401) shows the components. As the client progresses, the green line extends from top to bottom to indicate the progress. This example indicates that the client has finished the first two components and is in the middle of the Investor Type questionnaire. 1405 shows question 4 of the Investor Type questionnaire.

Figure 15:
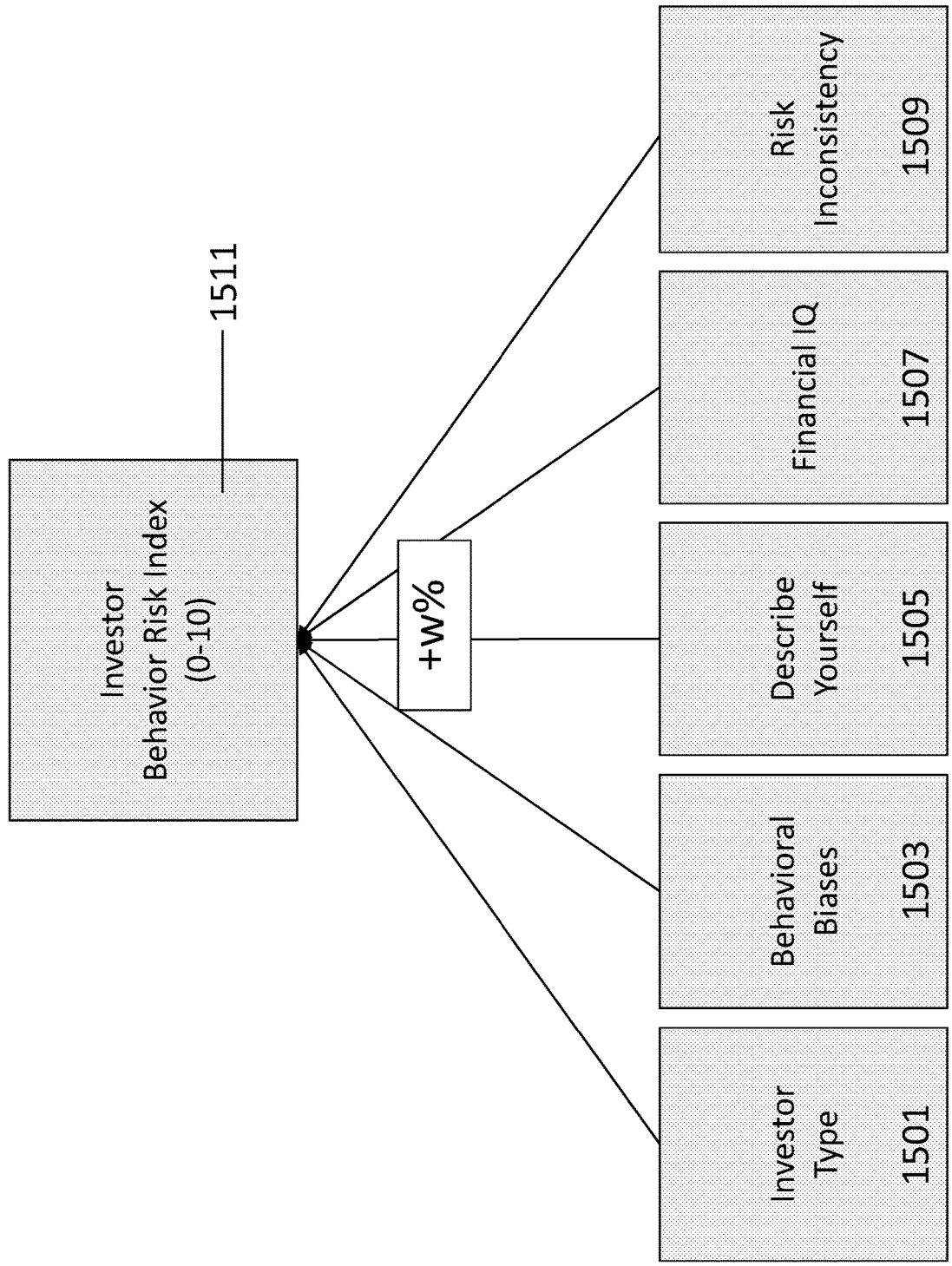
FIG. 15 schematically shows an example set of components contributing to an investor's Behavioral Risk Index in accordance with this application.

In reference to FIG. 15, the investor Behavior Risk Index 1511 aggregates multiple behavioral factors, using an algorithm of weighted average. The inputs include the Investor Type (1501), Behavioral Biases (1503) which includes multiple behavioral biases, Describe Yourself (1505) which includes multiple behavioral factors, Financial IQ (1507) and Risk Inconsistency (1509). This is a high-level diagram.

The following paragraphs first describe a few behavioral tests in detail to illustrate the approach, followed by the overview of ACCUPROFILE interface, trademarked by the inventor, the central user interface of the invention system. It then proceeds with the rest of the behavioral tests and finishes with the algorithm for the Behavioral Risk Index.

Figure 16:
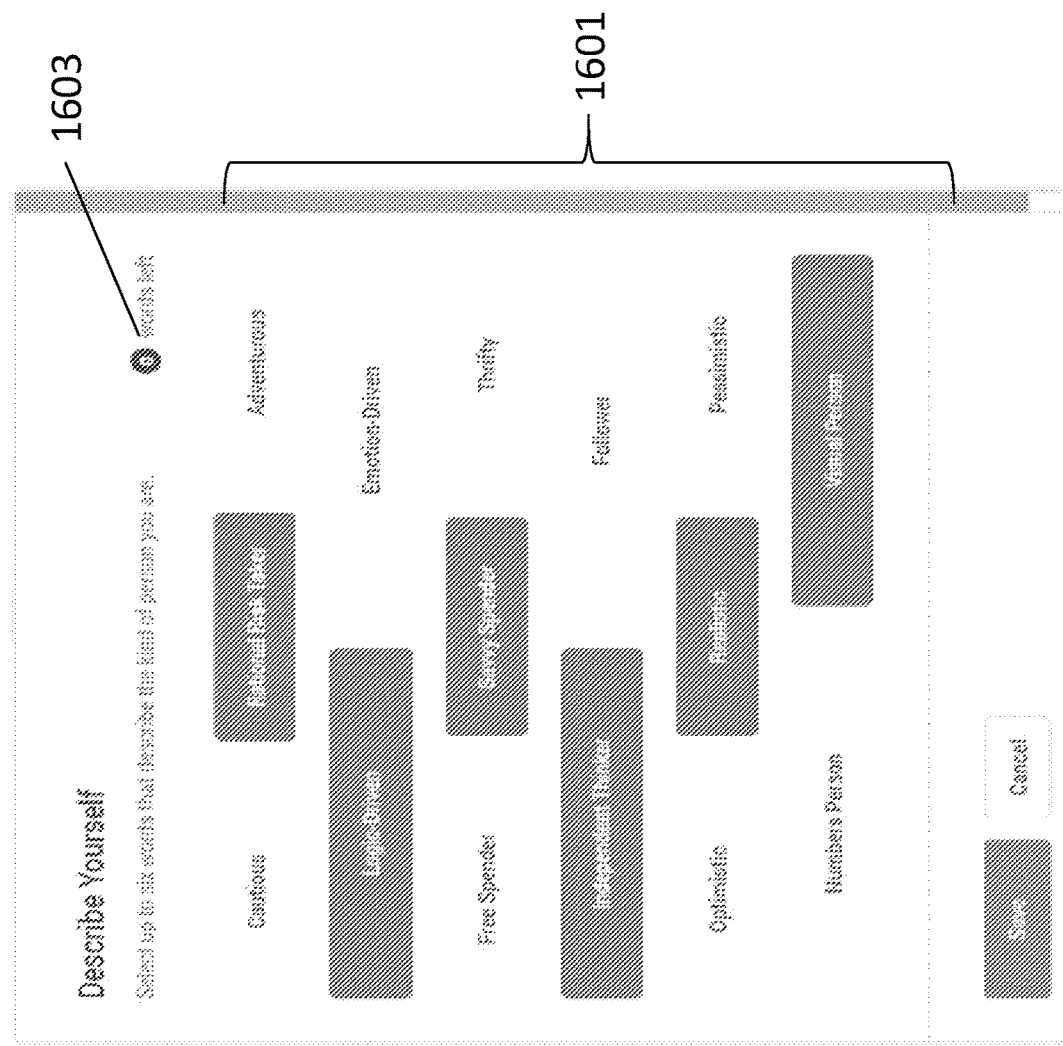
FIG. 16 shows an example user interface for "Describe Yourself" of a self-assessment tool in accordance with this application.

FIG. 16 illustrates an example user interface for "Describe Yourself", a self-assessment tool that invites clients to self-identify their own behavioral factors. There are six rows of words (1601), with each row representing one behavioral factor that would allow the users to self-identify their (1) risk-taking disposition, (2) whether they are logic driven or emotion driven, (3) their spending habits, (4) whether they are independent thinker or follower; (5) whether they tend to be optimistic or pessimistic; (6) whether they are a number sensitive person or a visual person. Clients are allowed to choose up to six words that describe themselves. 1603 indicates the number of words left for the client to choose. In this example, the client has chosen 6 words (the words in blue), hence there are 0 words left.

Figure 17:
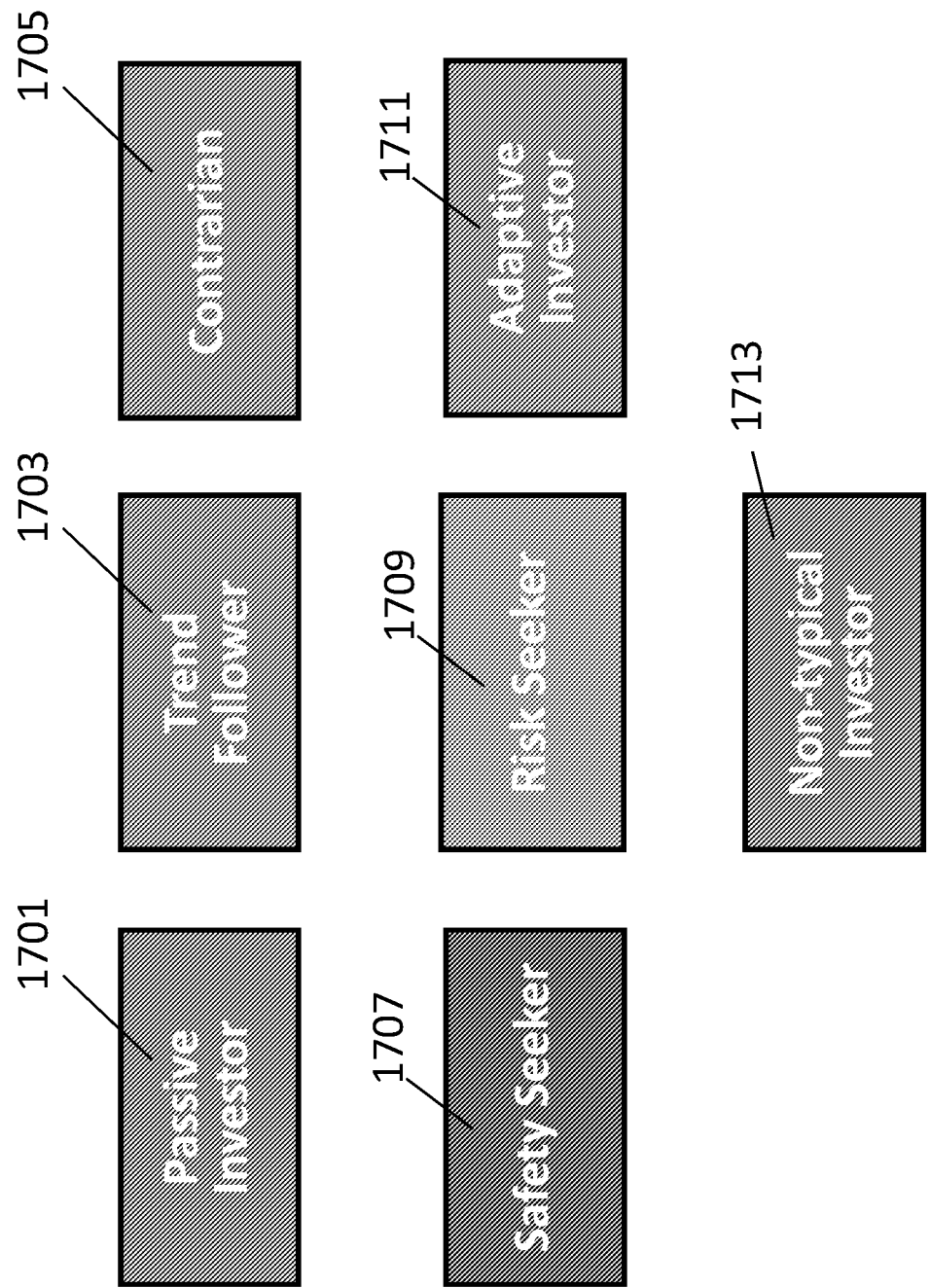
FIG. 17 schematically shows example seven investor types in accordance with this application.

In reference to FIG. 17, the determination of Investor Types categorizes investors into seven types: Buy-and-Hold Investor (or Passive Investor) 1701, Trend Follower 1703, Contrarian 1705, Risk Avoider (or Safety Seeker) 1707, Risk Taker 1709, Adaptive Investor 1711, and Non-typical Investor (or Other) 1713. The Investor Type, which indicates how investors react to market movements, significantly impacts the advisor-client relationship, hence it is important to determine the investor types of clients in a consistent and reliable way. The determination comes from the multiple-choice answers to four questions:

Q1: How would you change your asset allocation if the S&P 500 declined 20% in the past six months and other asset classes performed as you expected?
A. I would do nothing.
B. I would decrease my stock or shares allocation.
C. I would increase my stock or shares allocation.
D. I would research and decide.

Q2: Now the opposite scenario: how would you change your asset allocation if the S&P 500 rose 20% in the past six months and other asset classes performed as you expected?
A. I would do nothing.
B. I would decrease my stock or shares allocation.
C. I would increase my stock or shares allocation.
D. I would research and decide.

Q3: During the COVID-19 market turmoil, did you significantly decrease your exposure in the stock market?
A. Yes, when COVD-19 was spreading but the stock market was still fine.
B. Yes, when the market started to decline but before it hit the bottom.
C. Yes, right around when it hit the bottom.
D. No, I did not significantly decrease my allocation to stocks.
E. I actually increased my allocation to stocks.

Q4: How often do you check your investments?
A. Daily or weekly.
B. Monthly or quarterly.
C. Annually or rarely.

The combinations of answers are then directly mapped to one of the possible values for the Investor Type. An example mapping to the Investor Types is shown in FIG. 18. For example, the ones who choose A, A, D, B/C answers respectively to the first four questions are mapped to Buy-and Hold Type. The ones who choose B, A/B, A/B/C answers to respectively the first three questions are mapped to Risk Avoiding Type. The ones who choose B, C, A/B/C, A/B answers respectively to the first three questions are mapped to Trend Following Type. The ones who choose C, A/B/D, E, answers respectively to the first three questions are mapped to Contrarian Type. The ones who choose C, C, E answers respectively to the first three questions are mapped to Risk Seeking Type. The ones who choose A/D, A/D, A/B/E answers respectively to the first three questions are mapped to the Adaptive Type. Other combinations of answer choices are mapped to Non-typical Investor.

The next step is to assign the Behavioral Risk Score for each Investor Type, in preparation for the aggregation into the Behavioral Risk Index. The table below illustrates the assignment of the Behavioral Risk Score for Investor Type, along with the behavioral factors in the "Describe Yourself" tool.

TABLE II

Behavior Risk Scores for Investor Type and Part of "DescribeYourself" Section

| Behavioral Factor | Result | Behavioral Risk Score |
|---|---|---|
| Investor Type | Adaptive | 2 |
|  | Contrarian | 2 |
|  | Passive | 2 |
|  | Other (Non-typical Investor) | 5 |
|  | Risk Avoiding | 7 |
|  | Trend Following | 10 |
|  | Risk Seeking | 10 |
| Logical/Emotional | Logic Driven | 2 |
|  | Emotion Driven | 10 |
| Spending Habit | Savvy Spender | 2 |
|  | Thrifty | 5 |
|  | Free Spender | 10 |
| Thinker/Follower | Independent Thinker | 2 |
|  | Follower | 8 |

Note, for "Describe Yourself", only behavioral factors that directly contribute to the Behavioral Risk Index, i.e., Logical/Emotional, Spending Habit and Thinker/Follower, are scored in this table.

In reference to FIG. 19, once the investor type is determined, an animal symbol may be assigned to the investor profile as an easy tool for reminding the test results. Seven animal symbols can animatedly remind both the financial advisor and the inventor client their investment type to take appropriate precautions during market swings.

Now that we have a general sense of the approach, this section describes the overall structure of ACCUPROFILE, the central user interface of the invention system. In reference to FIGS. 20A through 20D, an example investor profile interface 2000 is shown. Because family members may influence each other's decision making, having the investor profiles of family members displayed side by side reveals the similarities and contrasts to better inform decision making. In the example, the investor profile of John Miller (2001) is displayed side by side with his wife Michelle Miller's profile (2002). The interface shows the respective overview sections that include Investor Types 2003 and 2004 (described earlier), Behavior Risk Indexes 2005 and 2006; the respective Risk Assessment sections that include Risk Appetite 2007 and 2008, Risk Tolerance Tests 2009 and 2010; the respective Cognitive Ability Tests that include Cognitive Ability 2011 and 2012, statuses of Senior Protections 2013 and 2014; the respective Behavior Biases tests 2015 and 2016; the respective Financial IQ test results 2017 and 2018; the respective Other section that include Describe Yourself 2019 and 2020; the ESG preferences 2021 and 2022; the respective investor client check-in sections 2023 and 2024 that checks on the client's opinion on the market (Market Sentiment), Personal Financial Outlook and Personal Financial Change.

In assessing investor behavior biases towards the financial market changes, three common behavioral biases, Loss Aversion, Over-Confidence, and Herding, are described. For each behavioral bias, the invention system offers a questionnaire to determine whether the investor has the behavioral bias. These biases are deeply wired in our survival instincts hence it is common to have them, and the point is to bring awareness to these biases so investors can keep their emotions in perspective. For example, Loss Aversion, also known as the prospect theory, is a well-known behavioral bias. Research suggests that the pain of losing is twice as powerful as the pleasure of gaining, so the feeling for losing 100 dollars is twice as strong as the pleasure of gaining 100 dollars. Another example is shown during the market turmoil at the outbreak of COVID-19. When S&P 500 lost 30% in early 2020, the fear and pain was extremely strong. But when S&P 500 gained 30% in 2019 the level of joy was nowhere nearly as strong, nor was it when the market recovered strongly later in 2020.

Having this awareness about this biologic reflective reaction can help clients deal with their emotions in context and help clients avoid making irrational investment decisions. The invention offers two questions to identify this Loss Aversion bias:

Q1: Out of the two options below, which one do you prefer?

A. 100% chance of gaining $2000.

B. 75% chance of gaining $4000; 25% chance of gaining nothing.

Q2: You are then presented with another set of two options below. Which one do you prefer?

A. 100% chance of losing $2000.

B. 50% chance of losing $5000; 50% chance of losing nothing.

For the first question, a rational investor would choose B, because the expected gain in B is $3000, much higher than the gain in A, while the risk is relatively small. However, investor with the tendency to secure gain would choose A because they can't bear the pain of the 20% chance of getting nothing.

The second question is even more painful to decide. People's gut reaction is often, "I want neither." But sometimes we do face a decision like this. For example, a gambler has lost $2000. Would he accept the loss, or doubling down in an effort to win it back? This is how gamblers end up digging a deeper hole for themselves. Rogue traders, who lose hundreds of millions of dollars for their firm, often started out with a much smaller loss, but instead of accepting the loss, they would double down, and dig a deeper and deeper hole for themselves.

The system directly maps the answers to the questionnaire to a result, as shown in FIG. 21. For example, the ones who choose A and B respectively for the two questions are mapped to Yes (has Loss Aversion); B and A, No Loss Aversion; A and A, Some Loss Aversion (Secure Gain); and finally, B and B, Some Loss Aversion (Double Down).

Overconfidence is a tendency to overestimate one's capability. In Ola Svenson's study in 1981, it was shown that 93% of Americans rate themselves as better than average when asked to rate their competency as drivers. Investor clients, also including professionals, may tend to overestimate their ability in picking stocks and in timing the market.

The invention system offers two questions to identify this tendency. The first is about market timing and the second one is about stock picking.

Q1: How easy do you think it was to predict the market turmoil due to the Coronavirus in early 2020?

A. Easy. It was so obvious.

B. Not that easy but doable.

C. It was difficult to predict.

Q2: Do you believe you can pick investments to beat the market?

A. Not really.

B. Maybe.

C. I believe so.

For Overconfidence, the invention system uses a scoring mechanism to grade the tendency. For the first question, 5 points are assigned for choosing A, 3 points for B, and 0 point for C. For the second question, 0 points for choosing A, 3 points for B and 5 points for C. Based on the total points, the result is mapped to: No Overconfidence (points 0-2), Some Overconfidence (points 3-7), Has Overconfidence (points 8-10).

Herding is also a common behavioral bias indicating if an investor tends to follow others instead of following their own analysis. Herding behavior at mass scale can create asset bubbles or market crashes when everyone buys or sells at the same time. The biological root for this type of behavior is linked to regret, because when following others, even if it may not be the best decision, people are less likely to regret it.

The invention system offers a questionnaire with three questions to identify this behavioral bias, using a scoring mechanism to grade the tendency.

Q1: When you chose a cell phone, how did you decide between iPhone and Android?

A. (3 points) I went with what was more popular in my social circle.

B. (0 point) I compared features and prices to make my decision.

Q2: Have you heard about bitcoin? If so, have you ever bought any?

A. (0 point) I was not aware of it.

B. (0 point) I stayed away because I did not really understand it or didn't feel comfortable with it.

C. (3 points) I bought some because a lot of people talked about it and I didn't want to miss out.

D. (0 point) I bought some after doing my own research.

Q3: In making decisions in life, how much are you influenced by what other people do?

A. (4 points) I often look at what other people do as a point of reference and tend to make similar decisions.

B. (0 point) I usually make my own decisions based on my own research and circumstances.

C. (2 points) Somewhere in the middle.

Based on the total points, the result is mapped to: No Herding (points 0-1), Some Herding (points 2-6), Has Herding (7-10).

The system also offers assessment to test the clients' financial IQ. People often overestimate their ability in finance and investments, especially those who are experts in certain fields, such as doctors and engineers. The system offers an objective assessment of the client's knowledge in investments, so that they can keep their intuitions and opinions in perspective.

To evaluate the client's financial IQ, the system offers a questionnaire with five questions, with each question covering a key concept in investments. A scoring mechanism is used to grade a client's investment knowledge level.

Q1: Suppose the interest rate on your savings account is 2% a year and the inflation are 3% a year. After one year, would the money in the account buy more or less compared to today?

A. (0 point) More.

B. (0 point) Same.

C. (2 point) Less.

D. (0 point) I don't know.

Q2: Suppose you have $100 in the savings account that earns 2 percent of interest every year. After five years, how much would you have?

A. (2 point) More than $110.

B. (1 point) Exactly $110.

C. (0 point) Less than $110 but more than $102.

D. (0 point) I don't know.

Q3: Is it safer to invest in a diversified pool of stocks or a single stock?

A. (2 point) A diversified pool of stocks.

B. (0 point) A single stock.

C. (0 point) I don't know.

Q4: (True or false) Asset allocation is the main driver for investment returns, instead of market timing or stock picking.

A. (2 point) True.

B. (0 point) False.

C. (0 point) I don't know.

Q5: (True or false) Mutual funds and ETFs such as iShares S&P 500 ETF, while consisting of a diversified pool of securities, are still subject to market risk.

A. (2 point) True.

B. (0 point) False.

C. (0 point) I don't know.

Based on the total points, the investor's Financial IQ is mapped to: Need Improvement (points 0-3), Fair (4-5), Good (6-7), Very Good (8), and Excellent (9-10).

Levels of knowledge test sets are also provided in the system, so that investor clients can have a learning path and take the test repeatedly.

TABLE III

Behavioral Risk Scores for behavioral biases (Loss Aversion, Overconfidence and Herding) and financial IQ

| Behavioral Factor | Result | Behavioral Risk Score |
|---|---|---|
| Loss Aversion | No | 0 |
| | Some (both variations) | 5 |
| | Yes | 10 |
| Overconfidence | No | 0 |
| | Some | 5 |
| | Yes | 10 |
| Herding | No | 0 |
| | Some | 5 |
| | Yes | 10 |
| Financial IQ | Excellent | 0 |
| | Very Good | 2 |
| | Good | 5 |
| | Fair | 8 |
| | Poor | 10 |

Investor behaviors are also influenced by Environmental, Social and Corporate Governance considerations (ESG). Many people's investment decisions may be based on ESG factors. Providing financial advisors a sense of whether there is a strong demand for ESG investing in their client base can guide their decision whether to offer ESG based investment models to clients.

This invention system offers a questionnaire with five questions to identify client's ESG preference through a scoring mechanism.

Q1: Have you heard about ESG or sustainability?

A. (0 point) No

B. (1 point) Vaguely

C. (2 points) Yes

Q2: ESG stands for Environmental, Social and Corporate Governance, three key factors in measuring the sustainability and societal impact of a company or business. When you purchase a product or service, how much do you care about the ESG impact of the company or business that provides the product or service?

A. (0 point) Not so much.

B. (1 point) I primarily care about the quality of the product/service and the price but am willing to consider the ESG impact.

C. (2 points) It is a major factor in my decision.

Q3: How much do you believe that you should consider the ESG factors in your investment?

A. (0 point) not so much. Investments are all about the risk and return.

B. (1 point) I primarily care about the risk and return but am willingness to support companies with better ESG practices.

C. (2 points) It is a major factor in my decision.

Q4: ESG funds may or may not perform better than their non-ESG counterpart. Are you willing to invest in an ESG fund if its average return is lower than its non-ESG counterpart?

A. (0 point) No.

B. (1 point) I am willing to sacrifice a little bit of return for the greater good.

C. (2 points) I am willing to take a lower return as long as I can still meet my financial goals.

Q5: Are you willing to invest in sin stocks, for example, gambling and tobacco, if they have above-average return?

A. (0 point) Why not?

B. (1 point) I will think about it.

C. (2 points) No way.

Based on the total points, the investor's ESG Preference is mapped to: Not Important (points 0-3), Somewhat Important (4-6), Important (7-8), and Very Important (9-10).

The present system also offers a classic questionnaire with seven questions to quantify the risk appetite of a client. This is one of the three ways for the Three-Dimensional Risk Tolerance Assessment, all of which contribute to the assessment of risk inconsistency.

Q1: In general, how would your best friend describe you as a risk taker?
A. (4 points) A real gambler.
B. (3 points) Willing to take risks after completing adequate research.
C. (2 points) Cautious.
D. (1 point) A real risk avoider.

Q2: You are on a TV game show and can choose one of the following. Which would you take?
A. (1 point) $1,000 in cash.
B. (2 points) A 50% chance at winning $5,000.
C. (3 points) A 25% chance at winning $14,000.
D. (4 points) A 5% chance at winning $100,000.

Q3: You have just finished saving for a "once-in-a-lifetime" vacation. Three weeks before you plan to leave, you lose your job. You would:
A. (1 point) Cancel the vacation.
B. (2 points) Take a much more modest vacation.
C. (3 points) Go as scheduled, reasoning that you need the time to prepare for a job search.
D. (4 points) Extend your vacation, because this might be your last chance to go first-class.

Q4: If you unexpectedly received $20,000 to invest, what would you do?
A. (1 point) Deposit it in a bank account, money market account, or an insured CD.
B. (2 points) Invest it in safe high-quality bonds or bond mutual funds.
C. (3 points) Invest it in stocks or stock mutual funds.

Q5: In terms of experience, how comfortable are you investing in stocks or stock funds?
A. (1 point) Not at all comfortable.
B. (2 points) Somewhat comfortable.
C. (3 points) Very comfortable.

Q6: Suppose a relative left you an inheritance of $100,000, stipulating in the will that you invest ALL the money in ONE of the following choices. Which one would you select?
A. (1 point) A savings account or money market mutual fund.
B. (2 points) A portfolio of stocks and bonds.
C. (3 points) A portfolio of 15 stocks.
D. (4 points) Commodities like gold, silver, and oil.

Q7: Your trusted friend, an experienced geologist, is putting together a group of investors to fund an exploratory gold mining venture. The venture could pay back 50 to 100 times the investment if successful. If the mine is a bust, the entire investment is worthless. Your friend estimates the chance of success is only 20%. If you had the money, how much would you invest?
A. (1 point) Nothing.
B. (2 points) One month's salary.
C. (3 points) Three month's salary.
D. (4 points) Six month's salary.

Based on the total points, the investor's Risk Appetite is mapped to: Low (points 0-10), Medium Low (11-13), Medium (14-18), Medium High (19-21), High (22-24), Very High (25-26).

To quantify risk inconsistency, each possible values are scored to facilitate the comparison, similar to the scoring in Table I.

TABLE IV

Scoring of Risk Appetite

| Risk Appetite Result | Score |
|---|---|
| Low | 1 |
| Medium Low | 2 |
| Medium | 3 |
| Medium High | 4 |
| High | 5 |
| Very High | 6 |

When the risk appetite testing results are consistent with the result from the Risk Tolerance Test (RTT), it assures the financial advisor that the result is accurate. But if the results differ significantly, it is advisable that the financial advisor have a deeper conversation with the client. For example, if a client with a medium low risk appetite have chosen an aggressive investment model, the financial advisor may need to make sure that the client fully understands the Risk Tolerance Test, especially the potential downside in the test. When the client insists that that is the model they want, the financial advisor may take a step of precaution to document the conversation in case the client later complaints about the loss during the market turmoil.

The present system also offers to quantify the risk inconsistency. If the Risk Appetite risk score is higher than RTT, it is not a problem, because the investor is taking less risk than their risk appetite. But if the RTT is higher than the risk appetite, the investor is taking on more risk than he/she could comfortably tolerate, there may be a problem. The system would calculate an inconsistency risk score for this mismatch.

$$\text{Inconsistency\_Score\_Pair1} = \max((RTT - \text{Risk Appetite}), 0) * 2 \quad (1)$$

The difference between the two assessments is multiplied by 2 to make it a scale from 0 to 10. For example, if the Risk Appetite is Low (=1), and the RTT is "Aggressive Plus" (=6), Inconsistency_Score_Pair1=(6-1)*2=10.

"Describe Yourself" provides the third way to assessment risk tolerance in one of its dimensions, allowing investors to choose from one of the three possible values that best describes their risk tolerance: Cautious, Rational Risk Taker, and Adventurous. To facilitate comparison with results from RTT and Risk Appetite questionnaire, a score is assigned to each of the possible values like Table I and Table IV.

TABLE V

Scoring of Risk-taking Attributes in "Describe Yourself"

| Risk Taking Result | Score |
|---|---|
| Cautious | 1 |
| Rational Risk Taker | 3 |
| Adventurous | 6 |

The algorithm for determining the inconsistency between the second pair: DESCRIBE_YOURSELF: RISK_TAKING (RT) and Risk Tolerance Test, is as follows:

If (RT==RATIONAL_RISK_TAKER)
   Inconsistency_Score_Pair2==0
Else
   Inconsistency_Score_Pair2=max ((RTT−RT), 0)*2

If the investor is a rational risk taker, the RTT can be anything, and it is still considered consistent; otherwise, it is essentially the same algorithm as the first pair. For example, if RT is cautious (=1), and the RTT is aggressive (=5), Inconsistency_Score_Pair2=(5−1)*2=8.

To determine the inconsistency between the third pair: Risk Appetite and RT, the following algorithm is used:
If (RT==RATIONAL_RISK_TAKER)
   Inconsistency_Score_Pair3==0
Else
   Inconsistency_Score_Pair3=abs (RT−Risk Appetite)*2

The absolute value (abs) is used to avoid having a negative inconsistency score. For example, if RT is cautious (=1), and the Risk Appetite is medium high (=4), Inconsistency_Score_Pair3=abs (1−4)*2=6.

Now the overall Risk Inconsistency Score is defined as the maximum of the three pairs:

$$\text{Risk\_Inconsistency\_Score} = \max(\text{Inconsistency\_Score\_Pair1}, \text{Inconsistency\_Score\_pair2}, \text{Inconsistency\_score\_pair3}) \quad (2)$$

All contributing investor behavioral risks are then summarily indexed into the Behavioral Risk Index, one single number that indicates how likely the client acts irrationally during the market turmoil. The Behavioral Risk Index is summarily calculated using an algorithm of weighted averages of the behavioral risk scores from all contributing behavioral factors (as defined in Table II and III and the Risk Inconsistency Score above), while the weights are defined in Table VI.

TABLE VI

Contributing Behavioral Factors for Behavior Risk Index and Weights

| Behavioral Factor | Weight |
| --- | --- |
| Investor Type | 20% |
| Risk Inconsistency | 20% |
| Financial Q | 10% |
| Loss Aversion (this is a behavioral bias) | 10% |
| Overconfidence (this is a behavioral bias) | 8% |
| Herding (this is a behavioral bias) | 8% |
| Logical/Emotional (an attribute in Describe Yourself) | 8% |
| Spending Habit (an attribute in Describe Yourself) | 8% |
| Thinker/Follower (an attribute in Describe Yourself) | 8% |

Figure 22A:
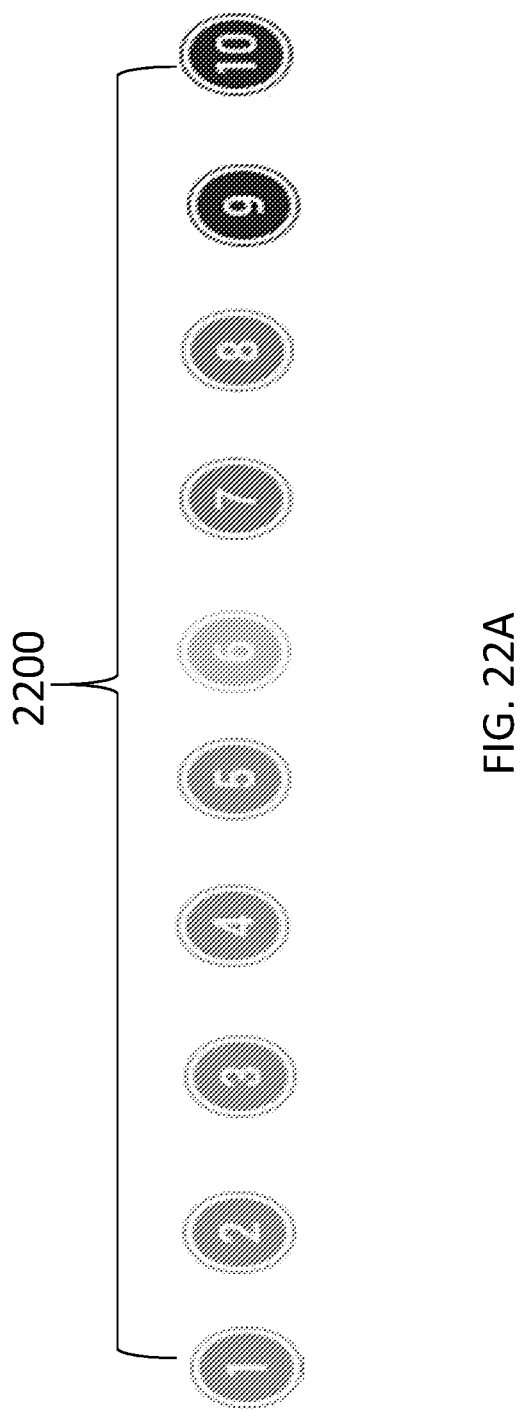
FIG. 22A is an array of color-coded indicators to indicate an investor's Behavioral Risk Index with 10 being of the highest behavioral risk in accordance with this application.

In reference to FIG. 22A, Behavioral Risk Index 2200 is color-coded to provide financial advisors and the investors an intuitive visual impression at one glance. After rounding the Behavioral Risk Index to the nearest integer, the color-coding is defined as the following: 0-5, green; 6, yellow; 7-8, orange; 9-10, red.

If the investor's behavioral profile is incomplete (for example, only Investor Type, Loss Aversion, and Financial IQ are known), the same principle applies for calculating the Behavioral Risk Index, with the special consideration to rescale the weights so the weights would sum up to 100%. A completeness indicator is also calculated to accompany the Behavioral Risk Index. In this case, the completeness is simply the sum of the weights of known behavioral factors: Completeness %=20%+10%+10%=40%.

For calculating the weighted average, the first step is to gather the raw weights (from Table VI) and the behavioral risk score of each result: Investor type (weight: 20%): the result is Other (=5); Loss aversion (10%): yes (10); and Financial IQ (10%): good (=5). To rescale the weights, each of the weights need to be divided by 40% so they would add up to 100%. The contributions of each factor now become: Investor type: 5*20%/40%=2.5; Loss aversion: 10*10%/40%=2.5; Financial IQ: 5*10%/40%)=1.25. And the total Behavior Risk index=2.5+2.5+1.25=6.25.

Figure 22B:
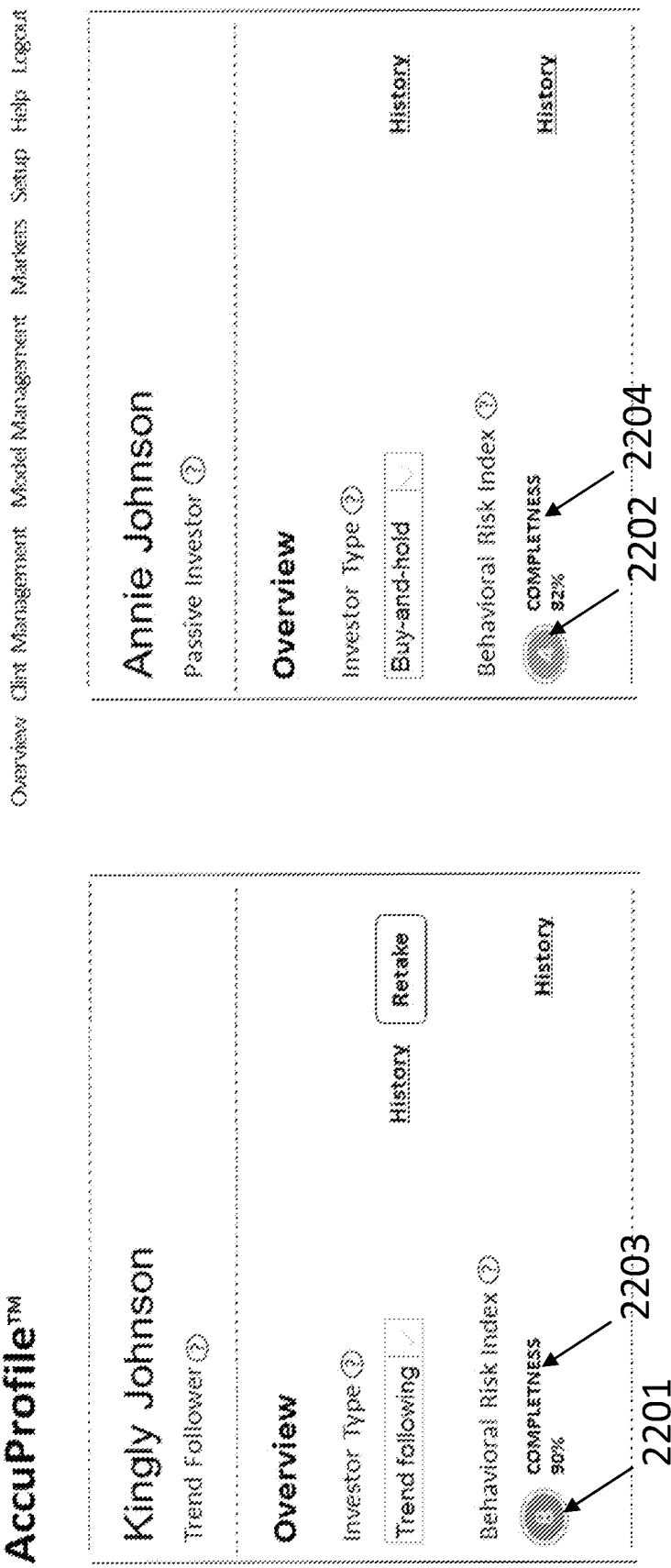
FIG. 22B shows an example investor profile user interface with investor behavior risk indicators in accordance with this application.
Figure 23:
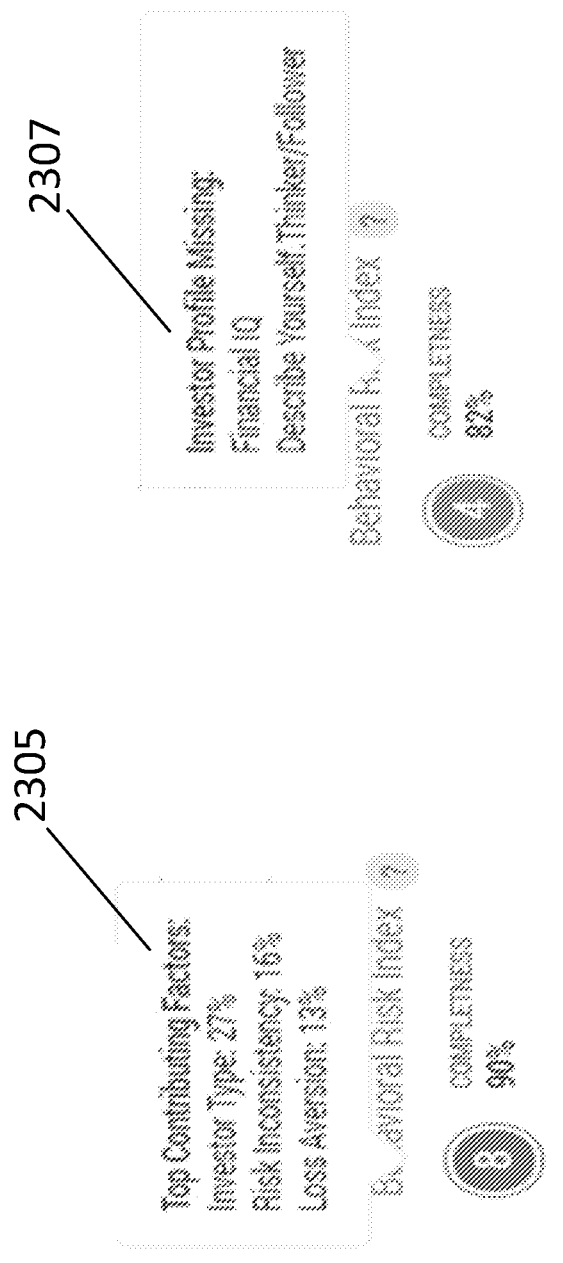
FIG. 23 shows an example hover-over feature for indicating details of a behavior risk index and a percentage complete status in accordance with this application.

In reference to FIG. 22B, the Completeness 2203 and 2204 are shown along with the Behavior Risk Index 2201 and 2202. The system also offers a hover over feature as shown in FIG. 23. Hovering over of a client's Behavioral Risk Index with the mouse, the user interface will display the top 3 contributing behavioral risk factors 2305 and the ratio of each factor's contribution. Hovering over the completeness shows which behavioral factors are not completed yet 2307.

When any behavioral factor that feeds into the Behavioral Risk Index changes, the Behavioral Risk Index is automatically recalculated in real time.

In reference to FIG. 24, the system offers an Investor Overview user interface, where a financial advisor can sort clients by the Behavioral Risk Index 2403. This feature can help financial advisors prioritize client management during market turmoil. The higher the behavior risk index 2401, the more likely the investor is subject to irrational investment behavior.

The invention system also offers a significant component to help better protect senior citizen clients or mentally impaired clients due to illness or injury. Senior citizens often suffer from physical conditions including age-related cognitive declines, Alzheimer's disease, and dementia. Their abilities in making financial decisions often become compromised before they show any signs of physical difficulties in daily lives, hence financial advisors may notice the declines before a medical diagnosis. These senior citizens are more likely to become victims to scams, coercions, and manipulations, hence it is important to place a protection mechanism in client management in a timely manner. However, due to cultural sensitivity, financial advisors often hesitate to bring the subject matter to client for fear of offending the client. To remove the sensitivity, the present system provides a standard process for working with senior citizen clients. Like doctors recommending certain tests for certain ages, the present invention system recommends the Cognitive Ability Test for clients 65 years and older. Clients typically receive Excellent or Very Good at age 65, establishing a baseline. When the cognitive ability starts to decline, clients will be able to see the trend themselves, so financial advisors do not need to be the messenger and instead be the problem solver to put the protection in place for them.

The system's Cognitive Ability Test is adapted from what doctors do clinically, where the doctor would ask a patient to remember three words but immediately switch gears to talk about other things for a few minutes, then doctor would ask the clients to recollect the three words. The system offers a similarly structured Cognitive Ability Test, but instead of random chat, the system asks a few math questions before asking the client to recollect the three words.

Cognitive Ability Test is a questionnaire with five questions, using a scoring mechanism to grade the results.

Q1: Think of three words, for example, "apple, penny, beach". Write them down on a piece paper and put it away. Now answer this question: what is 8+7?
   A. (1 point) 15
   B. (0 point) 12
   C. (0 point) 17
   D. (0 point) I don't know.

Q2: A neighbor walks your dog when you are away for 6 days. You pay the neighbor $11 for each day. How much money do you pay altogether?
  A. (0 point) $50
  B. (1 point) $60
  C. (2 points) $66
  D. (0 point) Sounds like a lot of money. I don't want to think about it.

Q3: Now recollect the three words you put down at the beginning. How many words can you recollect?
  A. (0 point) 0
  B. (1 point) 1
  C. (2 points) 2
  D. (3 points) 3

Q4: How much effort did it take you to answer the questions above?
  A. (3 points) Effortless.
  B. (3 points) Some effort.
  C. (2 points) A good amount of effort.
  D. (1 point) A lot of effort.
  E. (0 point) I gave up.

Q5: Do you feel that you are getting more forgetful over the past year?
  A. (3 points) Not at all.
  B. (2 points) A little bit.
  C. (1 point) Noticeably so.
  D. (0 point) Very much so.

Based on the total points, the result is mapped to one of the following: Poor (points 0 to 2), Fair (3-5), Good (6-7), Very Good (8-9), and Excellent (10-12).

Figure 25:
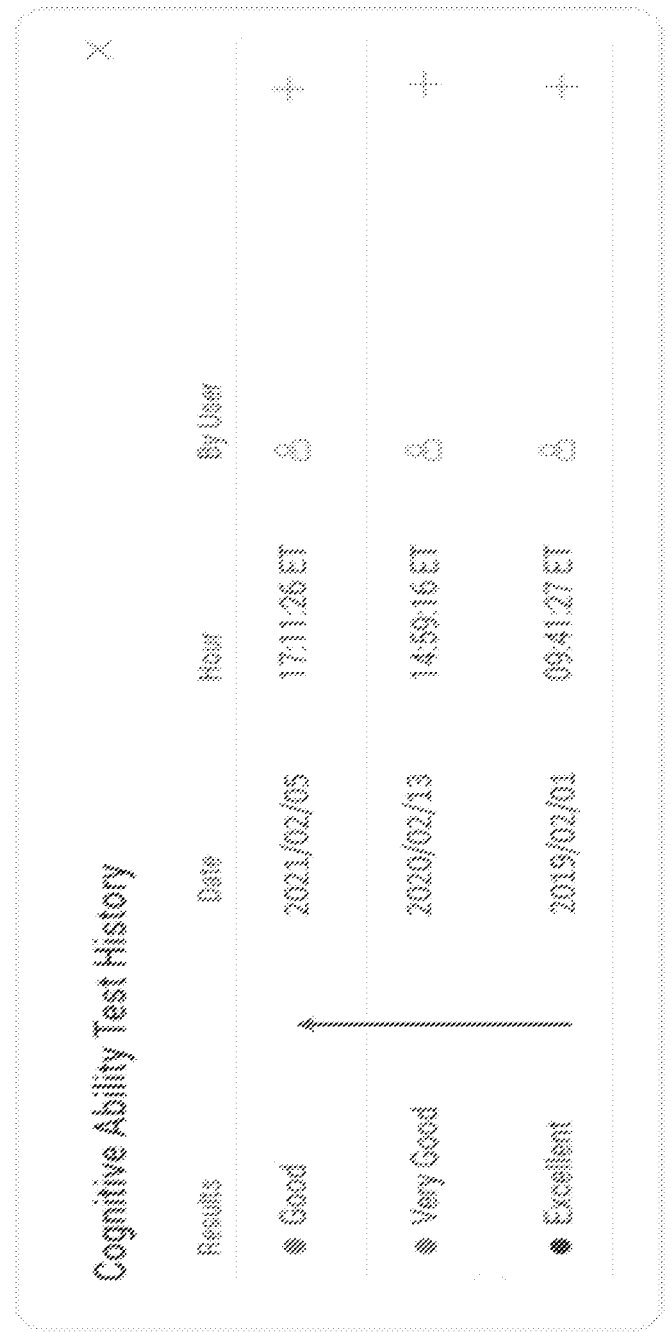
FIG. 25 shows an example user interface for recording a client's Cognitive Ability Test history in accordance with this application.

Clients are requested to take this Cognitive Ability Test when at age 65 or younger, most people would typically receive an Excellent or Very Good. Clients may take the test annually or more frequently if needed. Financial advisors and clients can review the test result in the system, as shown in 2011 and 2012 in FIG. 20B. Advisors and clients can also click on the history to view the history (as shown in FIG. 25). When the decline happens, clients would see the decline for themselves. Clients can also conduct the tests on themselves as needed.

Because the grading for the Cognitive Ability Test is relatively generous to protect the client's feelings, it is time for financial advisor to place protection process for the client if the test result is "Good" or worse. This senior citizen protection process (alternatively a protection process for mentally impaired clients due to injury or disability), would typically involves placing a durable power of attorney which could be an adult child, a friend or an attorney who can be trusted with making financial decisions for the client. With the client's permission, advisors can also put in place a "withdrawal verification" process, that advisors will check with the client about unusual withdrawal requests and decline the withdrawal if it sounds suspicious (as it is often the case with scams). When the financial advisor puts the protection process in place, they can set the flag as shown in 2013 and 2014 in FIG. 20B to indicate the status.

Figure 20A:
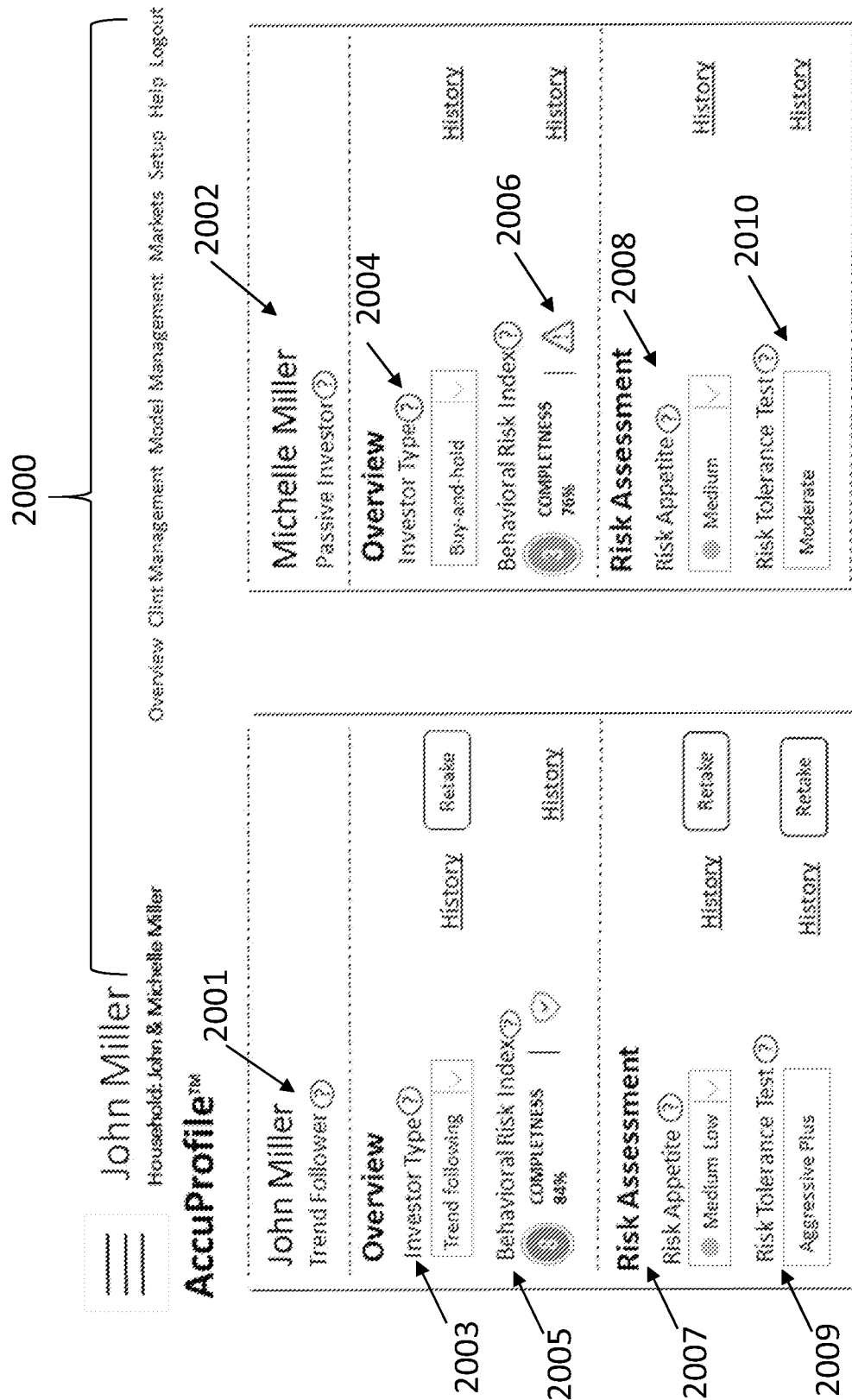
FIG. 20A shows an example investor profile user interface that displays the first section of investor profile in the system in accordance with this application.
Figure 20B:
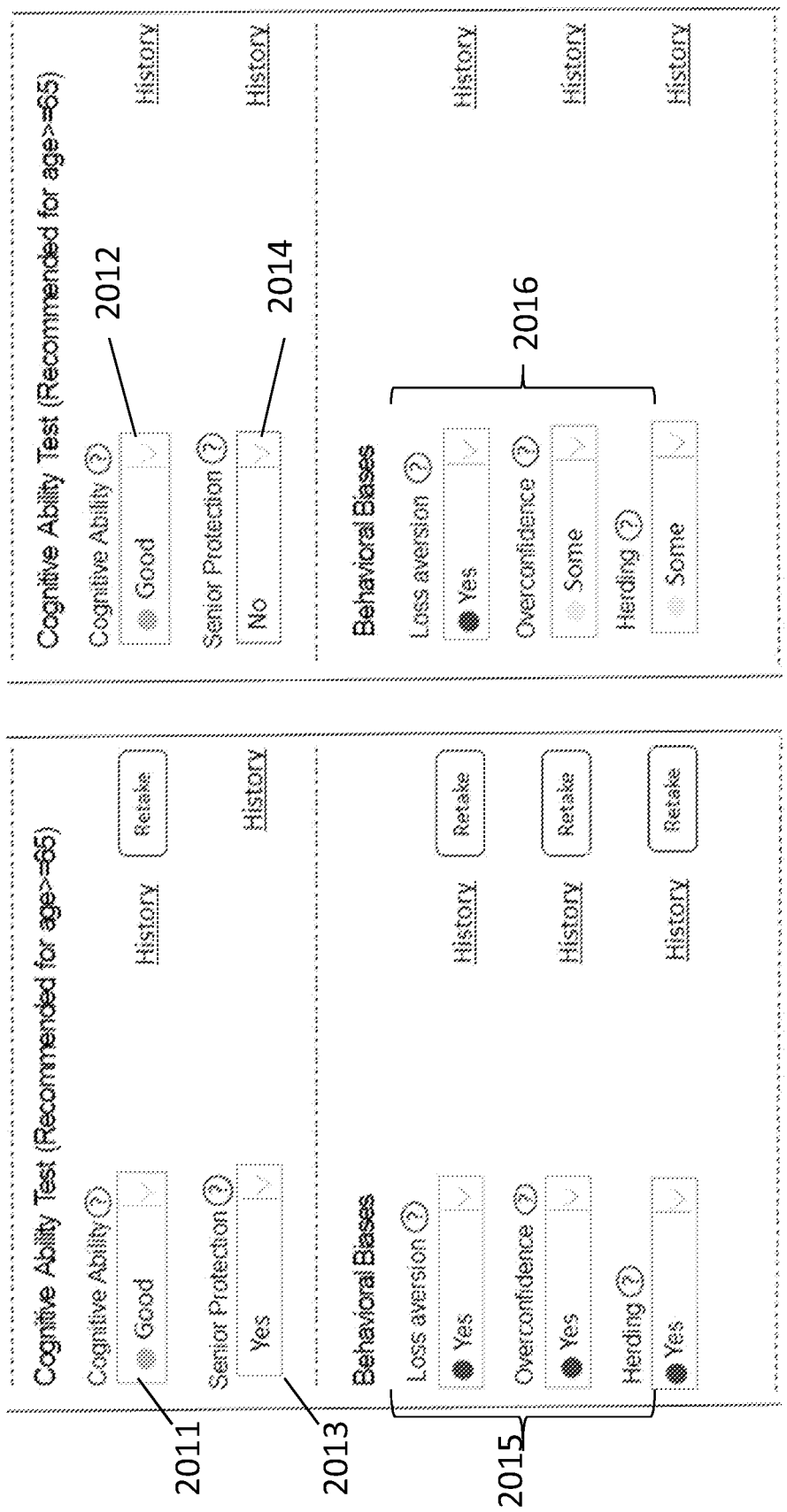
FIG. 20B shows an example investor profile user interface that displays the second section of investor profile including the cognitive ability test and behavioral biases in the system in accordance with this application.
Figure 20C:
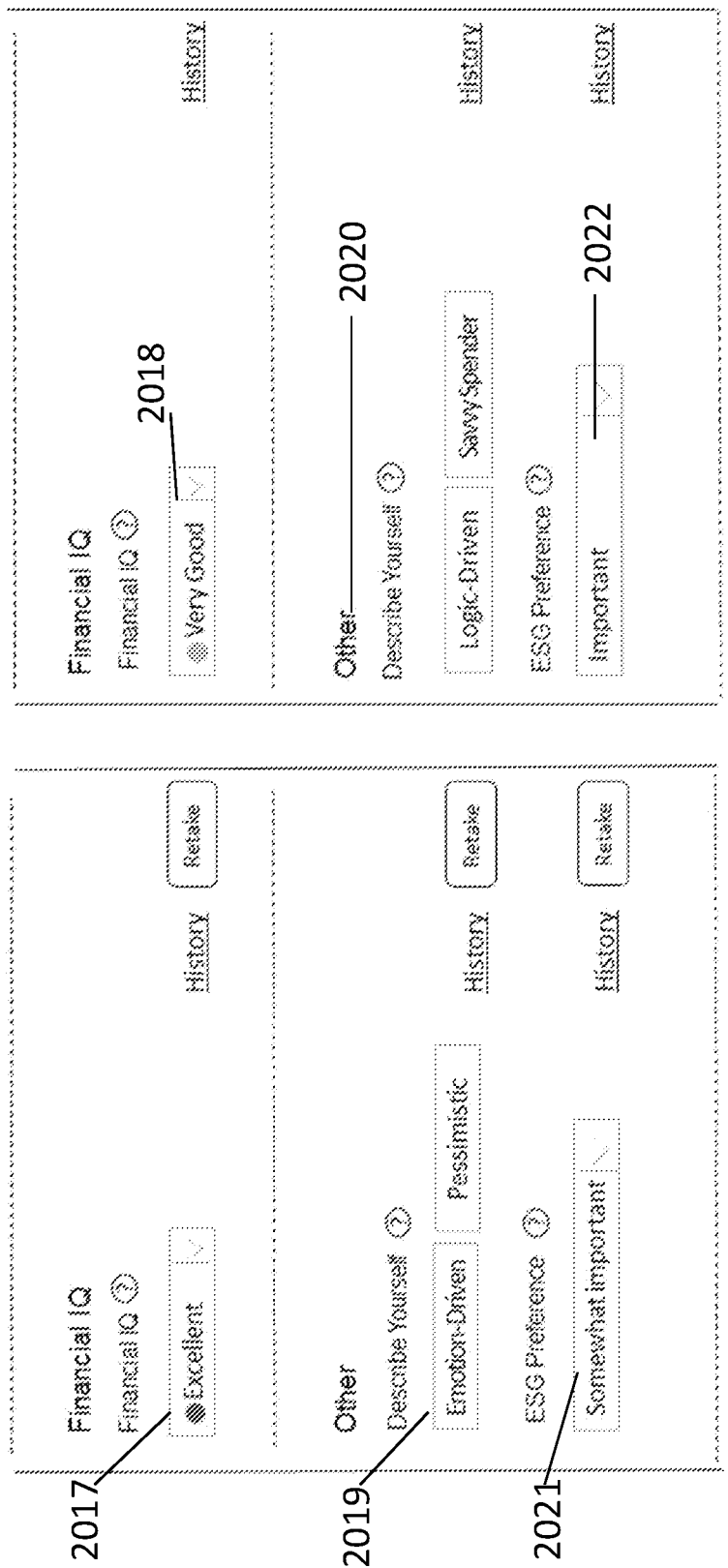
FIG. 20C shows an example investor profile user interface that displays the third section of investor profile including financial IQ test, Describe Yourself, and ESG preference in the system in accordance with this application.
Figure 20D:
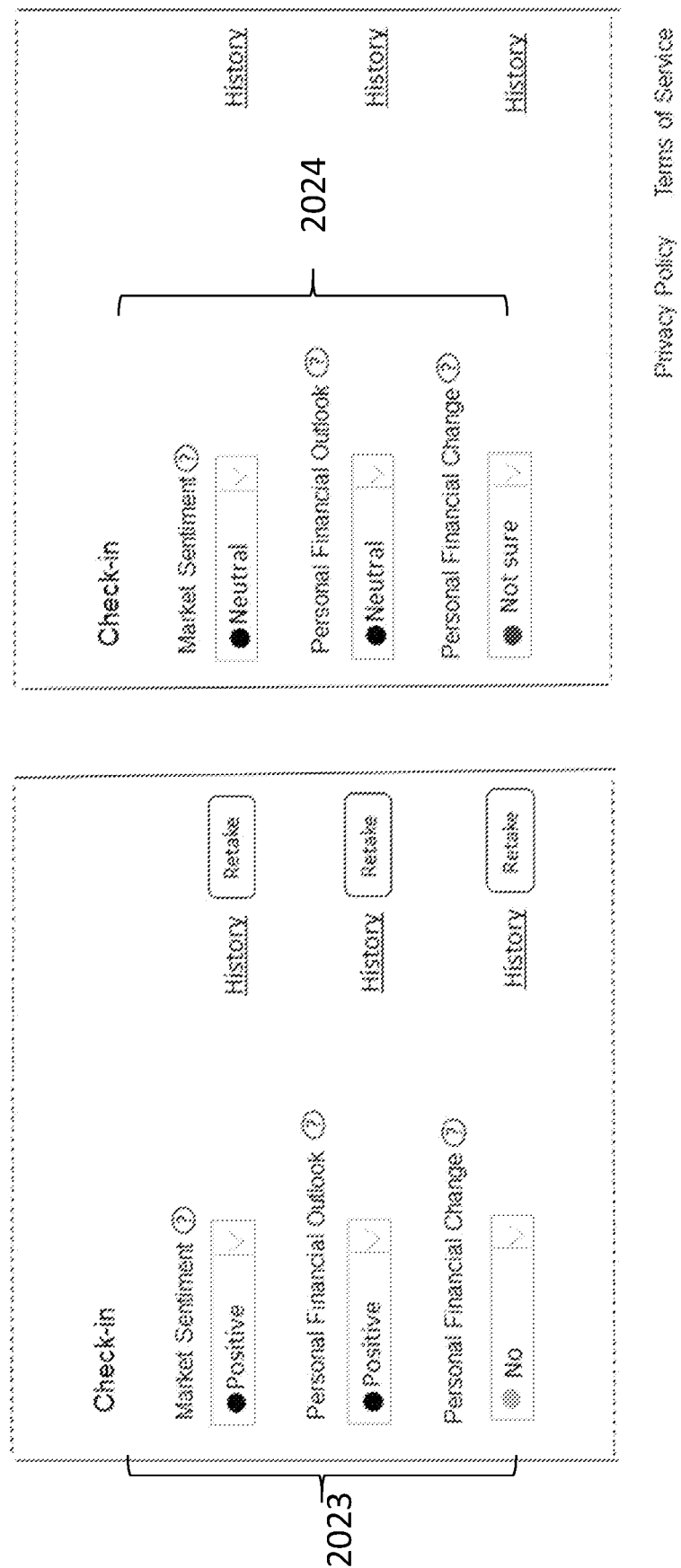
FIG. 20D shows an example investor profile user interface that displays the fourth section of investor profile including financial checking-in with clients in the system in accordance with this application.
Figure 26:
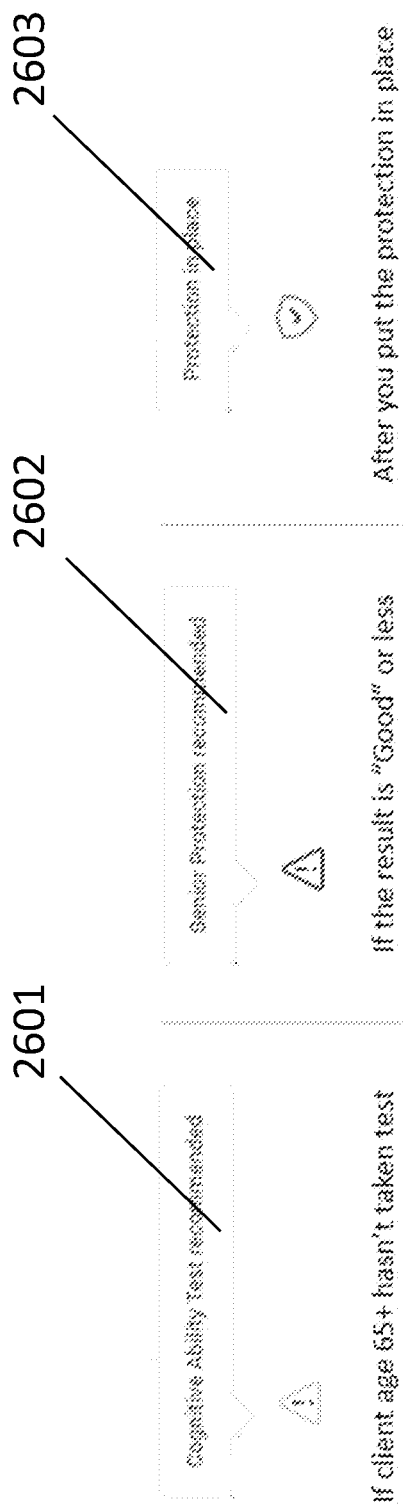
FIG. 26 shows an example icon system used to indicate the senior citizen protection status in accordance with this application.

To facilitate the protection process workflow, alert icons are used to remind financial advisors the actions they need to take, as shown in 2006 in FIG. 20A. FIG. 26 describes the alert icons in detail. There are three status icons: the yellow alert icon (2601) indicating that the Cognitive Ability Test should be taken, the red alert icon (2602) indicating that the senior protection should be put in place, and the green shield icon (2603) indicating that the protection is in place.

In reference to FIG. 26, the logic for the status icons is the following. If the client's age is below 65, display nothing; if the client's age is 65 or higher but has not taken the Cognitive Ability Test, display yellow alert icon 2601 to remind to take the test; If the client has taken the test and the result is Excellent or Very Good, display nothing; If the test is Good or worse, display the red alert icon 2602 to remind to set up senior protection; If the client has senior protection in place, display the green shield icon 2603. Similar logic is used for client who may be mentally impaired due to injury upon a cognitive ability test.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

What is claimed is:

1. A method for computerized investor profiling and behavioral risk management, with "Q" representing questionnaires, comprising the steps of:
   providing a computer system with processors and hardware for displaying graphics and running computer operating systems;
   providing a computer module for retrieving historical financial market data of a historical time period wherein said historical financial market data include data of a set of securities and daily financial market data for said set of securities;
   providing a modularized scalable design for breaking down an investor behavioral profile into a set of both parallel and hierarchical quantitative behavioral factors, each of which being independently determined;
   providing a set of questionnaires and tools, for evaluating the investor behavioral profile's quantitative behavioral factors and quantitative behavioral risks;
   providing a quantitative index scoring mechanism for quantifying the investor's behavioral risks by combining a plurality of quantitative behavioral factors; and
   providing a visual indicator for displaying said quantitative index scoring mechanism and a user interface for displaying the investor behavioral profile.

2. The method of claim 1, wherein said investor behavioral profile is broken down to a set of behavioral factors including Investor Type, Behavior Biases, Financial IQ, Risk Appetite, preferences in ESG (Environmental, Social and Corporate Governance) factors, Cognitive Ability, spending habits, and consistency in risk preferences, each of which is optionally independently assessed.

3. The method of claim 2, wherein a questionnaire with five questions is used to determine the Cognitive Ability using a scoring algorithm, said questionnaire comprises:
   Q1 being "Think of three words, for example, 'apple, penny, beach' and write them down on a piece paper and put it away, Now answer this question: what is 8+7" with choices of answers being
     A) 15;
     B) 12;
     C) 17;
     D) I don't know;
   Q2 being "A neighbor walks your dog when you are away for 6 days, you pay the neighbor $11 for each day, How much money do you pay altogether" with choices of answers being A) $50;
B) $60;
C) $66;
D) Sounds like a lot of money, I don't want to think about it;

Q3 being "Now recollect the three words you put down at the beginning, how many words can you recollect" with choice of answers being
A) 0;
B) 1;
C) 2;
D) 3;

Q4 being "How much effort did it take you to answer the questions above" with choices of answers being
A) Effortless;
B) Some effort;
C) A good amount of effort;
D) A lot of effort;
E) I gave up; and Q5 being "Do you feel that you are getting more forgetful over the past year" with choices of answers being
A) Not at all;
B) A little bit;
C) Noticeably so;
D) Very much so;

wherein for each question, each answer key is assigned a score, and the scores for all questions are summed up to a total score and the total score is mapped to one of the following: Excellent, Very Good, Good, Fair, and Need Improvement.

4. The method of claim 3, wherein the user interface further comprises a plurality of status icons to remind financial advisors to remind the investor to take the Cognitive Ability Test, to set up a senior protection process and to indicate whether the senior protection process is in place.

5. The method of claim 2, wherein the method further comprises the step of assigning scores to the investor's Risk Tolerance Test (RTT) and Risk Appetite.

6. The method of claim 5, wherein the method further comprises the step of assigning scores to the investor's Self-Described Risk-Taking (RT) levels, selected from Cautious, Rational Risk Taker, and Adventurous.

7. The method of claim 6, wherein the method further comprises the step of determining the investor's Risk Inconsistency Score by obtaining the maximum value from a plurality of comparisons, wherein Inconsistency_Score_Pair1=max ((RTT−Risk Appetite), 0)*2;

Inconsistency_Score_Pair2=max ((RTT−RT), 0)*2 if RT is not "Rational Risk Taker), otherwise Inconsistency_Score_Pair2=0;

Inconsistency_Score_Pair3=abs (RT−Risk Appetite)*2 if RT is not "Rational Risk Taker), otherwise Inconsistency_Score_Pair3=0;

Risk_Inconsistency_Score=max (Inconsistency_Score_Pair1; Inconsistency_Score_pair2, Inconsistency_score_pair3).

8. The method of claim 7, wherein the method further comprises the step of determining the investor's Behavior Risk Index as a weighted average of multiple behavioral factors comprising Investor Type, Risk Inconsistency, Loss Aversion, Overconfidence, Herding, Financial IQ, Self-described Logical/Emotional, Self-described Spending Habit, and Self-described Thinker/Follower wherein, For each behavioral factor, a behavioral risk score is assigned to quantify into the investor's Behavioral Risk Index.

9. The method of claim 8, wherein the investor's Behavior Risk Index is represented with a color-coding scheme in the investor profile in the user interface.

10. The method of claim 9, wherein the method further comprises the step of a completeness indicator, which is the sum of the weights of the completed behavioral factors, displayed in the user interface along with the Behavioral Risk Index wherein hovering over the investor's Behavioral Risk Index displays the top contributing factors and hovering over the completeness indicator displays missing factors.

11. The method of claim 10, wherein the method further comprises the step of calculating the investor's Behavioral Risk Index and Completeness indicator in real time with both being automatically recalculated when any behavioral factor that feeds into the investor's Behavioral Risk Index changes.

12. The method of claim 2, wherein a visual tool is designed to allow the investor to choose words that best describe himself along multiple dimensions of behavioral factors.

13. The method of claim 1, wherein the method further comprises an automated process for generating an Investment Policy Statement (IPS) that provides a modularized scalable definition of the IPS comprising sections, with each section comprising one or more components for customization.

14. The method of claim 13, wherein the method further comprises the step of pulling data from a database to dynamically generate charts including bar charts, pie charts, time series charts, and/or Risk Tolerance Test chart.

15. The method of claim 14, wherein the method further comprises the step of dynamically composing the sections and components into an IPS document.

\* \* \* \* \*